US012586903B2

(12) United States Patent
Oh et al.

(10) Patent No.: US 12,586,903 B2
(45) Date of Patent: Mar. 24, 2026

(54) ELECTRONIC DEVICE FOR EXTENDING OPERATION RANGE OF ANTENNA

(71) Applicant: SAMSUNG ELECTRONICS CO., LTD., Suwon-si (KR)

(72) Inventors: Chanhee Oh, Suwon-si (KR); Kyuyoung Kim, Suwon-si (KR); Yongyoun Kim, Suwon-si (KR); Byoungryoul Song, Suwon-si (KR); Seungbum Choi, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 18/121,261

(22) Filed: Mar. 14, 2023

(65) Prior Publication Data

US 2023/0216199 A1 Jul. 6, 2023

Related U.S. Application Data

(63) Continuation of application No. PCT/KR2021/012361, filed on Sep. 10, 2021.

(30) Foreign Application Priority Data

Sep. 15, 2020 (KR) ........................ 10-2020-0118226

(51) Int. Cl.
*H01Q 7/00* (2006.01)
*H01Q 21/28* (2006.01)
*H04B 5/43* (2024.01)

(52) U.S. Cl.
CPC ............... *H01Q 7/00* (2013.01); *H01Q 21/28* (2013.01)

(58) Field of Classification Search
CPC .......... H01Q 7/00; H01Q 21/28; H01Q 1/243; H01Q 1/2208; H01Q 7/06; H04B 5/263;
(Continued)

(56) References Cited

U.S. PATENT DOCUMENTS 10,651,543 B2 5/2020 Wang et al.
2004/0183743 A1 9/2004 Reasoner et al.
(Continued)

FOREIGN PATENT DOCUMENTS

CN 105789827 7/2016
CN 109075424 A 12/2018
(Continued)

OTHER PUBLICATIONS

International Search Report for PCT/KR2021/012361 mailed Dec. 29, 2021, 4 pages.
(Continued)

*Primary Examiner* — Minh Tran
(74) *Attorney, Agent, or Firm* — Nixon & Vanderhye P.C.

(57) ABSTRACT

Various embodiments of the present disclosure relate to an electronic device for extending an operation range of an antenna. The electronic device may comprise: a foldable housing including a first housing, a second housing, and a hinge module including a hinge disposed between the first housing and the second housing; a first coil positioned inside the second housing and including n designated turns; a second coil positioned inside the first housing and including m designated turns less than the n, the second coil being connected in series with the first coil; a communication module comprising communication circuitry electrically connected to the first coil and the second coil; and a processor for controlling the communication module.

14 Claims, 25 Drawing Sheets

(58) Field of Classification Search
CPC ...... H04B 5/43; H04M 1/0277; H04M 1/026; H04M 1/0214; H04M 1/0216
See application file for complete search history.

(56) References Cited

U.S. PATENT DOCUMENTS

| | | | | |
|---|---|---|---|---|
| 2006/0118625 | A1 | 6/2006 | Sekita | |
| 2007/0161419 | A1 | 7/2007 | Dakeya | |
| 2012/0218695 | A1* | 8/2012 | Sakai | H01Q 9/145 361/679.01 |
| 2013/0038278 | A1 | 2/2013 | Park et al. | |
| 2015/0122575 | A1 | 5/2015 | Park et al. | |
| 2016/0210615 | A1* | 7/2016 | Lee | G06Q 20/3278 |
| 2016/0261026 | A1 | 9/2016 | Han et al. | |
| 2017/0228721 | A1 | 8/2017 | Lee et al. | |
| 2017/0310367 | A1* | 10/2017 | Choi | H04W 4/80 |
| 2017/0338697 | A1 | 11/2017 | Lee et al. | |
| 2018/0040950 | A1 | 2/2018 | Lee et al. | |
| 2018/0175966 | A1 | 6/2018 | Kim et al. | |
| 2018/0219584 | A1* | 8/2018 | Bimbaud | H04B 5/79 |
| 2018/0347921 | A1* | 12/2018 | Morrison | H01L 23/3733 |
| 2018/0366813 | A1 | 12/2018 | Kim et al. | |
| 2019/0006756 | A1 | 1/2019 | Lee et al. | |
| 2019/0222063 | A1* | 7/2019 | Park | H04B 5/24 |
| 2021/0065961 | A1* | 3/2021 | Lee | G06F 1/1616 |
| 2021/0320410 | A1 | 10/2021 | Liu | |
| 2021/0328329 | A1 | 10/2021 | Kim et al. | |
| 2021/0344783 | A1 | 11/2021 | Jeong et al. | |
| 2023/0216199 | A1 | 7/2023 | Oh et al. | |

FOREIGN PATENT DOCUMENTS

| | | |
|---|---|---|
| CN | 109725680 | 5/2019 |
| JP | 2017-118304 | 6/2017 |
| KR | 10-2007-0017514 | 2/2007 |
| KR | 10-2013-0100088 | 9/2013 |
| KR | 10-1584555 | 1/2016 |
| KR | 10-1594158 | 2/2016 |
| KR | 10-2017-0066944 | 6/2017 |
| KR | 10-2017-0093020 | 8/2017 |
| KR | 10-2017-0121954 | 11/2017 |
| KR | 10-2018-0015899 | 2/2018 |
| KR | 10-1843897 | 3/2018 |
| KR | 10-2018-0057178 | 5/2018 |
| KR | 10-1874641 | 6/2018 |
| KR | 10-1963288 | 3/2019 |
| KR | 10-2019-0083855 | 7/2019 |
| KR | 10-2020-0024500 | 3/2020 |
| KR | 10-2020-0025439 | 3/2020 |
| WO | 2014/155689 | 10/2014 |
| WO | 2022060016 A1 | 3/2022 |

OTHER PUBLICATIONS

Written Opinion of the ISA for PCT/KR2021/012361 mailed Dec. 29, 2021, 5 pages.
Extended European Search Report dated Dec. 22, 2023 issued in European Patent Application No. 21869638.3.
Chinese Office Action dated Jan. 13, 2026 issued in Chinese Patent Application No. 202180062757.1 and English translation, 18 pp.

* cited by examiner

ELECTRONIC DEVICE FOR EXTENDING OPERATION RANGE OF ANTENNA

CROSS-REFERENCE TO RELATED APPLICATIONS

This application is a continuation of International Application No. PCT/KR2021/012361 designating the United States, filed on Sep. 10, 2021, in the Korean Intellectual Property Receiving Office and claiming priority to Korean Patent Application No. 10-2020-0118226, filed on Sep. 15, 2020, in the Korean Intellectual Property Office, the disclosures of which are incorporated by reference herein in their entireties.

BACKGROUND

Field

The disclosure relates to an electronic device for extending an operation range of an antenna.

Description of Related Art

Electronic devices are getting slimmer and are improving to increase the stiffness, emphasize the design, and differentiate the functional elements. Electronic devices have been gradually transformed from a uniform rectangular shape to various shapes. An electronic device may have a transformable structure that is easy to carry and allows use of a large screen display. For example, as a transformable structure, an electronic device (e.g., a foldable electronic device) may include at least two foldable housings that operate to be folded onto or unfolded from each other.

A foldable electronic device may include a hinge module, and a first housing and a second housing connected through the hinge module in opposite directions. Such a foldable electronic device may be operated in an in-folding and/or out-folding manner such that the first housing is rotated through the hinge module with respect to the second housing in a range of 0-360 degrees. The foldable electronic device may include a flexible display disposed to cross over the first housing and the second housing when unfolded 180 degrees.

The foldable electronic device may include multiple antennas (coils) to support short-range wireless communication technology such as near field communication (NFC), magnetic secure transmission (MST), or wireless charging.

SUMMARY

Embodiments of the disclosure may provide an electronic device capable of extending an operation range of an antenna supporting a short-range wireless communication technology.

An electronic device according to various example embodiments of the disclosure may include: a foldable housing including a first housing, a second housing, and a hinge module including a hinge disposed between the first housing and the second housing; a first coil positioned in the second housing and including a specified n number of turns; a second coil positioned in the first housing, including a specified m number of turns less than the n turns, and connected in series to the first coil; a communication module comprising communication circuitry electrically connected to the first coil and the second coil; and a processor configured to control the communication module.

An electronic device according to various example embodiments of the disclosure may provide an electronic device capable of extending an operation range of an antenna supporting a short-range wireless communication technology.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
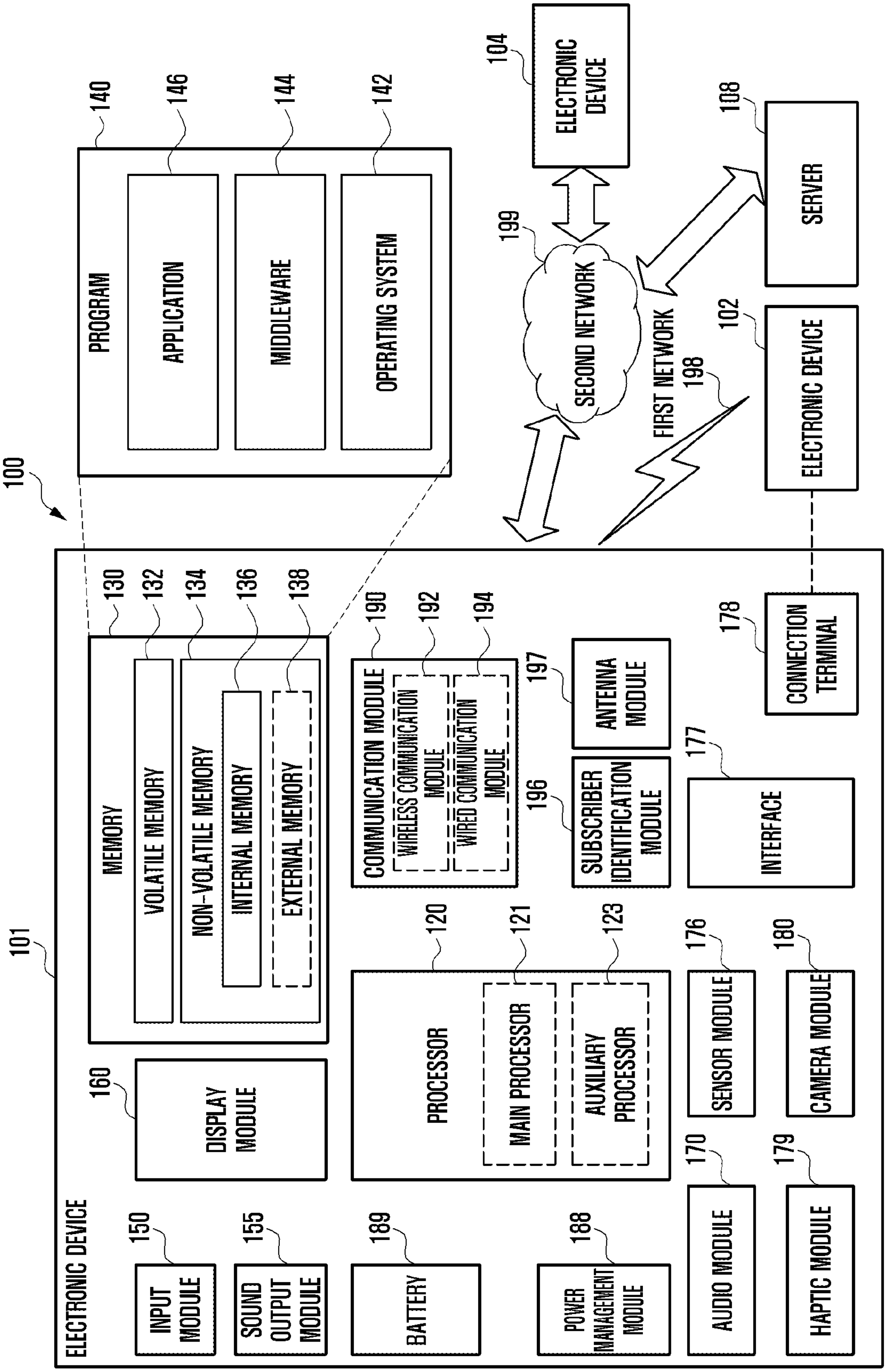
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
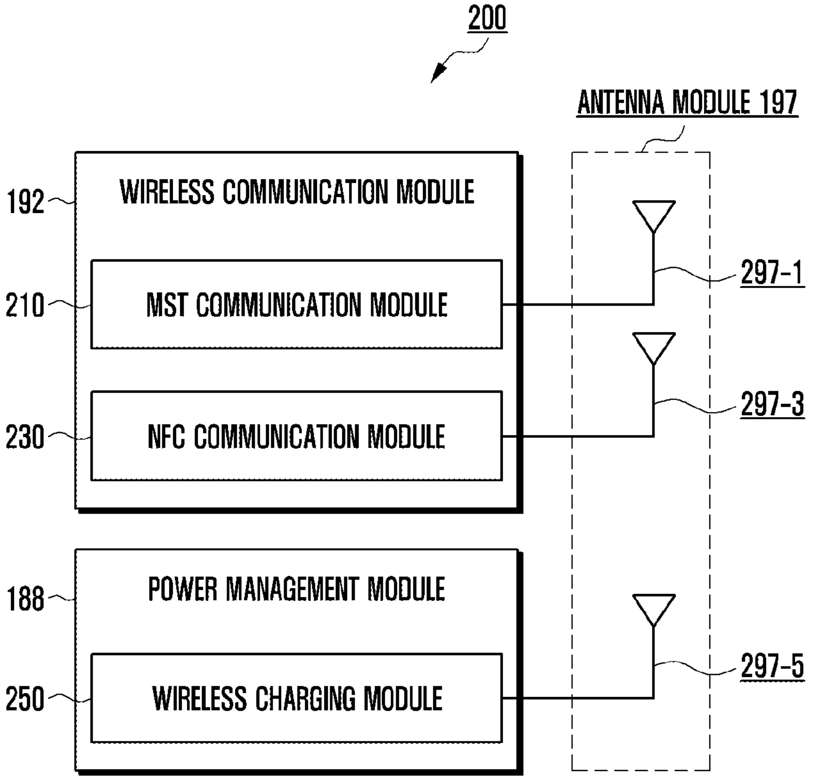
FIG. 2 is a block diagram illustrating an example configuration of a wireless communication module, a power management module, and an antenna module of an electronic device according to various embodiments.

FIG. 2 is a block diagram 200 illustrating an example configuration of the wireless communication module 192, the power management module 188, and the antenna module 197 of the electronic device 101 according to various embodiments. Referring to FIG. 2, the wireless communication module 192 may include a magnetic secure transmission (MST) communication module (e.g., including MST communication circuitry) 210 and/or a near-field communication (NFC) module (e.g., including NFC communication circuitry) 230, and the power management module 188 may include a wireless charging module (e.g., including wireless charging circuitry) 250. In such a case, the antenna module 197 may include a plurality of antennas that include a MST antenna 297-1 connected with the MST communication module 210, a NFC antenna 297-3 connected with the NFC communication module 230, and a wireless charging antenna 297-5 connected with the wireless charging module 250. For ease of description, the same components as those described in regard to FIG. 1 are briefly described or not repeated in the description.

The MST communication module 210 may include various MST communication circuitry and receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

The NFC communication module 230 may include various NFC communication circuitry and obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

The wireless charging module 250 may include various wireless charging circuitry and wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

Figure 3A:
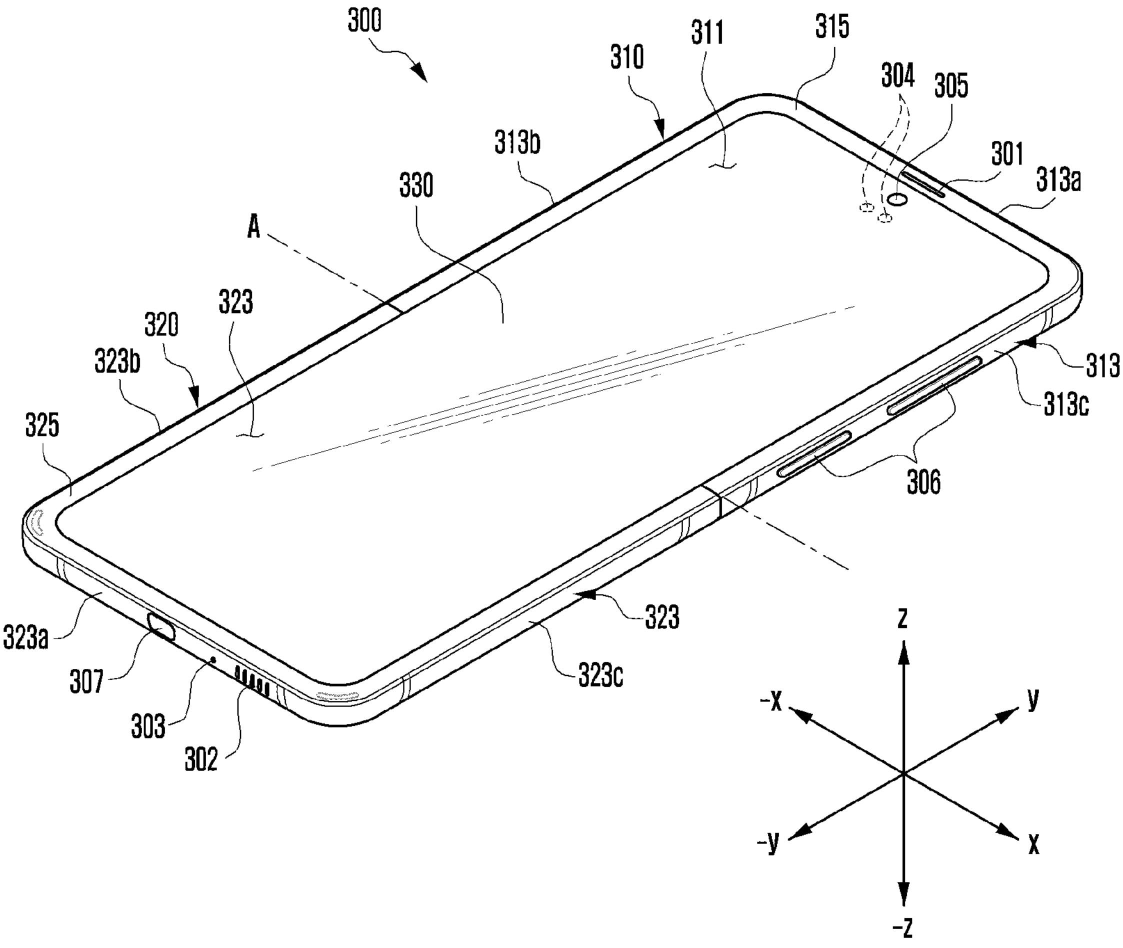
FIG. 3A is a front perspective view of an electronic device showing an unfolded state (flat stage or unfolding state) according to various embodiments.
Figure 3B:
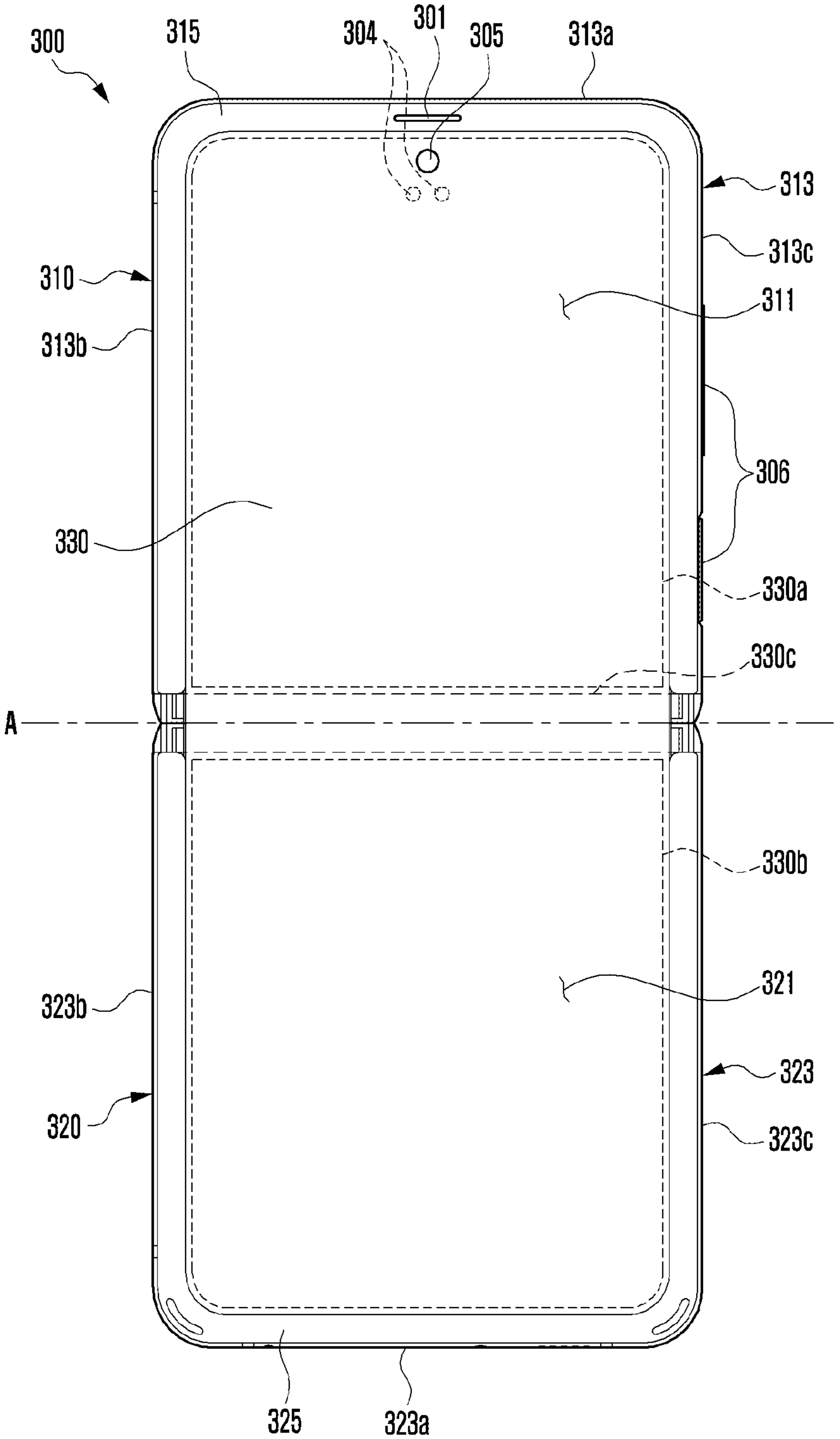
FIG. 3B is a diagram illustrating a front surface of an electronic device in an unfolded state according to various embodiments.
Figure 3C:
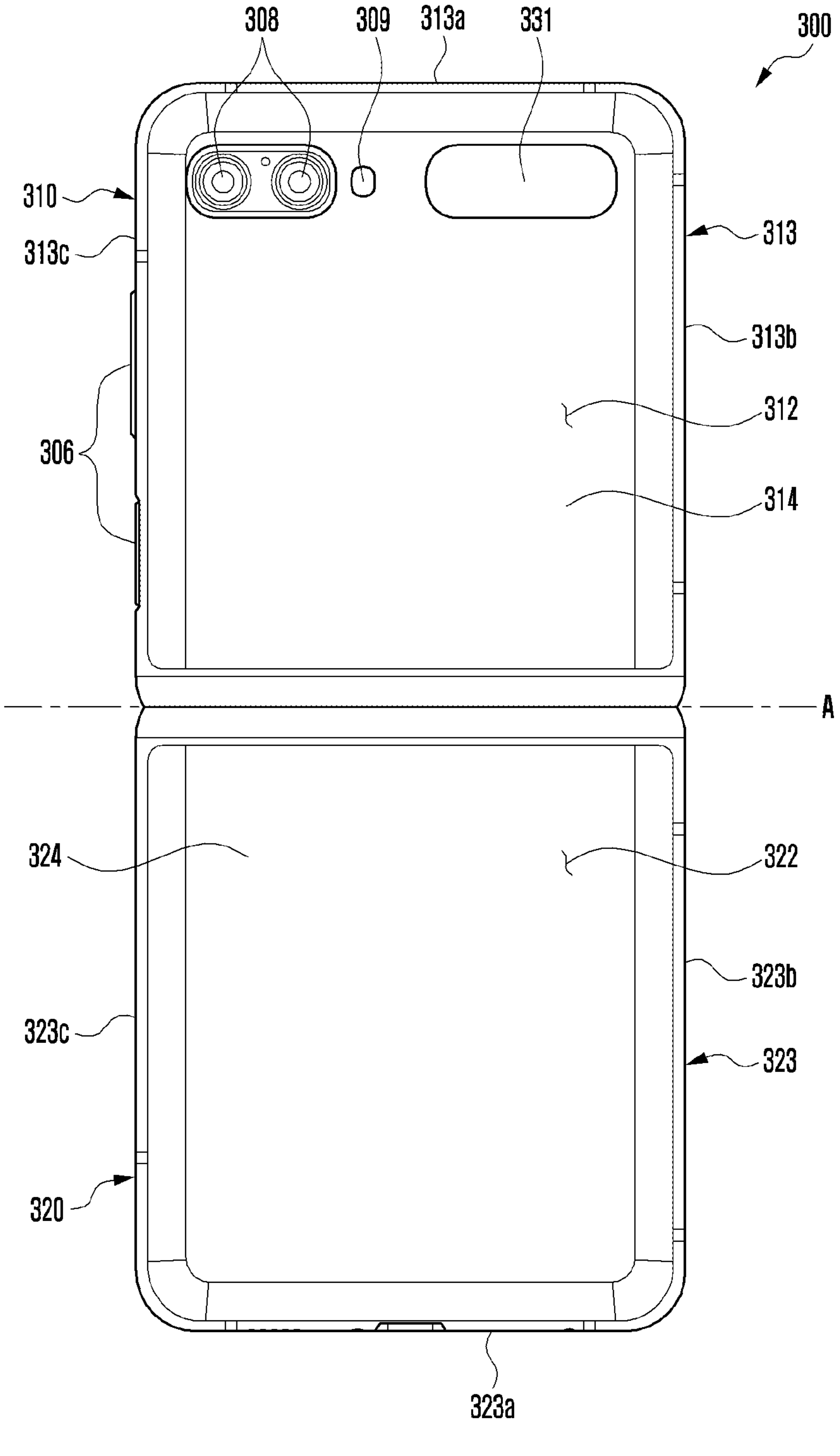
FIG. 3C is a diagram illustrating a rear surface of an electronic device in an unfolded state according to various embodiments.

FIG. 3A is a front perspective view of an electronic device in an unfolded state (flat stage) according to various embodiments. FIG. 3B is a diagram illustrating a front surface of an electronic device in an unfolded state according to various embodiments. FIG. 3C is a diagram illustrating a rear surface of an electronic device in an unfolded state according to various embodiments.

Figure 4A:
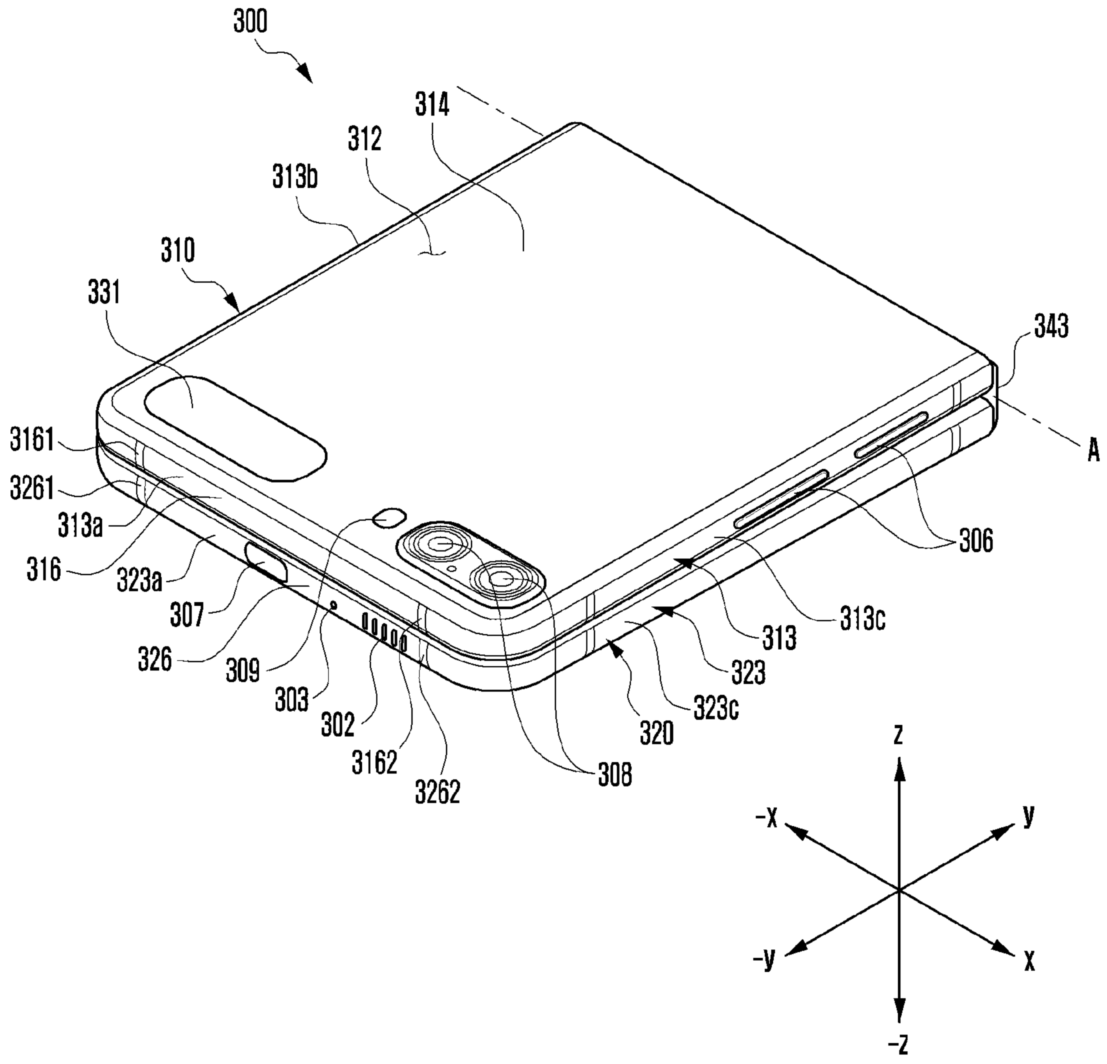
FIG. 4A is a perspective view of an electronic device illustrating the electronic device in a folded state (folding state) according to various embodiments.
Figure 4B:
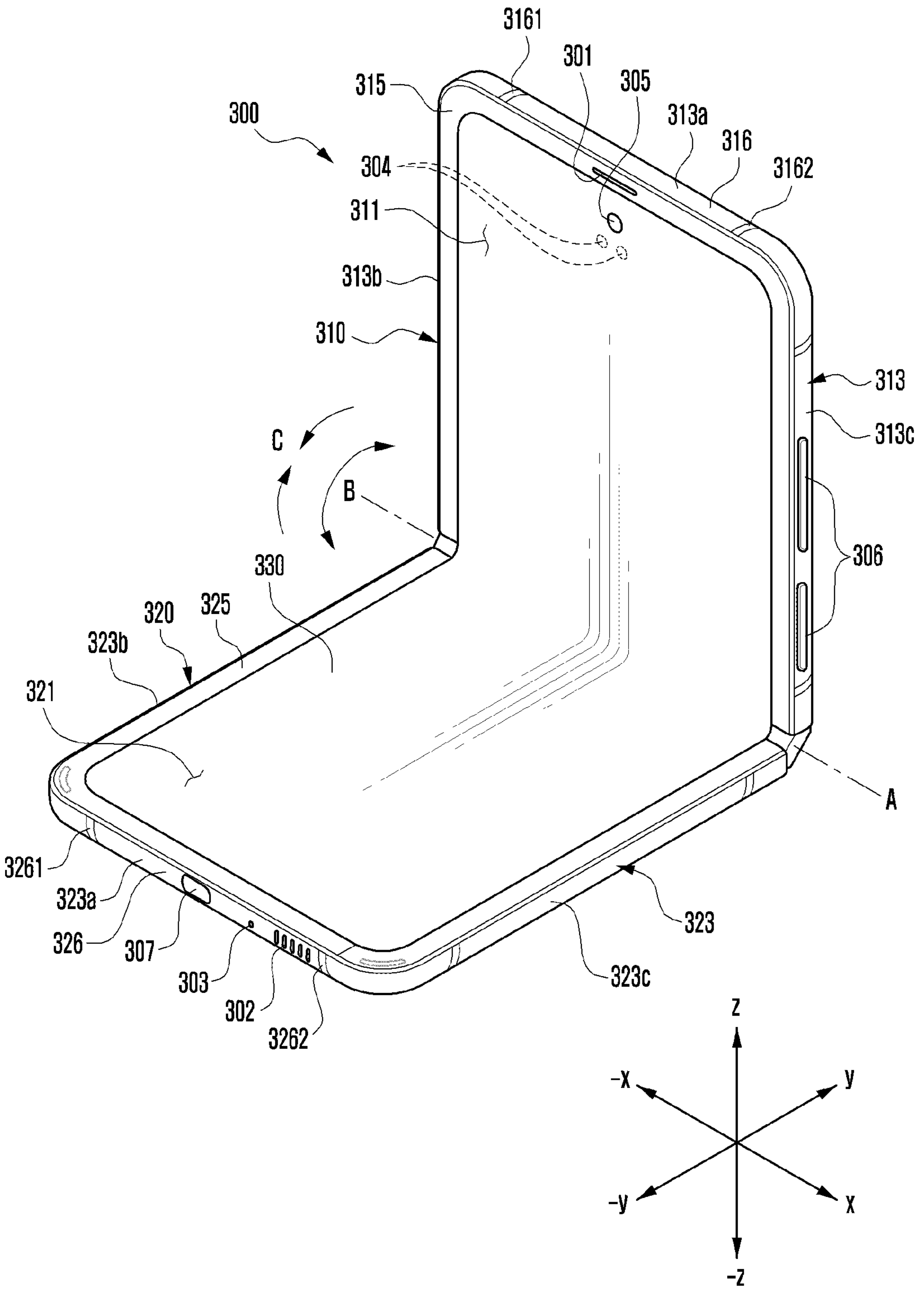
FIG. 4B is a front perspective view of an electronic device illustrating an electronic device in an intermediate state according to various embodiments.

FIG. 4A is a perspective view of an electronic device in a folded state according to various embodiments. FIG. 4B is a front perspective view of an electronic device illustrating an intermediate state according to various embodiments.

Figure 5:
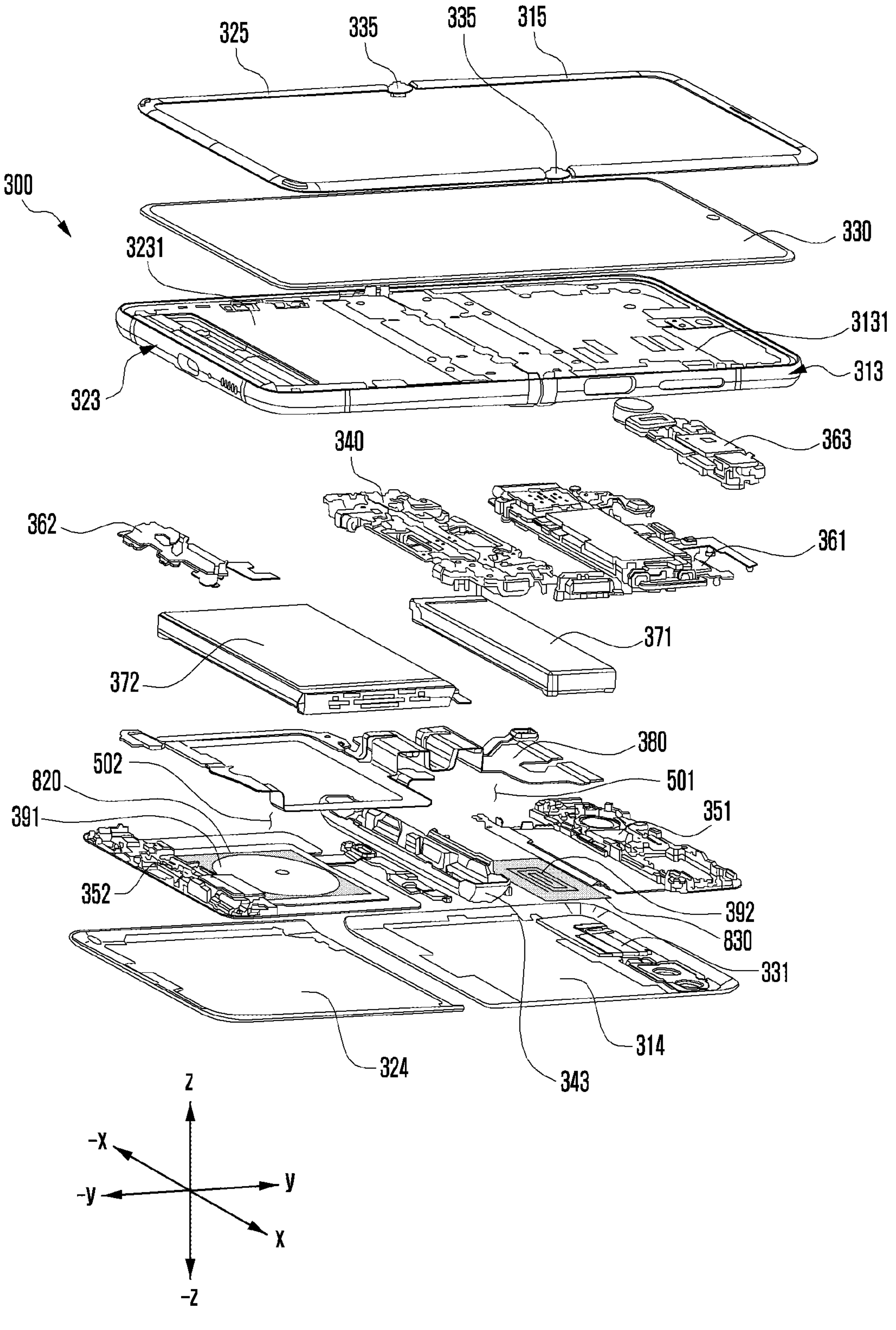
FIG. 5 is an exploded perspective view of an electronic device according to various embodiments.

Referring to FIGS. 3A, 3B, 3C, 4A and 4B (which may be referred to as FIGS. 3A to 4B), an electronic device 300 may include a pair of housings 310 and 320 (e.g., a foldable housing) rotatably coupled so as to be oppositely folded onto each other with respect to a hinge module (e.g., a hinge module 340 in FIG. 5). In an embodiment, the hinge module (e.g., the hinge module 340 in FIG. 5) may be disposed in an X-axis direction or a Y-axis direction. In an embodiment, two or more hinge modules (e.g., the hinge module 340 in FIG. 5) may be arranged to be folded in substantially the same direction or different directions.

According to an embodiment, the electronic device 300 may include a flexible display 330 (e.g., a foldable display) disposed in an area configured by the pair of housings 310 and 320. According to an embodiment, the first housing 310 and the second housing 320 may be arranged at both sides of a folding axis (axis A), and may be substantially symmetric with respect to the folding axis.

According to an embodiment, the angle or distance between the first housing 310 and the second housing 320 may be different according to whether the electronic device 300 is in an unfolded state (flat state), a folded state, or an intermediate state.

According to various embodiments, the pair of housings 310 and 320 may include the first housing 310 (e.g., a first housing structure) coupled to the hinge module (e.g., the hinge module 340 in FIG. 5) and the second housing 320 (e.g., a second housing structure) coupled to the hinge module (e.g., the hinge module 340 in FIG. 5).

According to an embodiment, the first housing 310 may include a first surface 311 facing a first direction (e.g., a front direction) (z-axis direction) and a second surface 312 facing a second direction (e.g., rear direction) (−z-axis direction) opposite to the first surface 311 in an unfolded state.

According to an embodiment, the second housing 320 may include a third surface 321 facing the first direction (z-axis direction) and a fourth surface 322 facing the second direction (−z-axis direction) in an unfolded state.

According to an embodiment, the electronic device 300 may be operated such that the first surface 311 of the first housing 310 and the third surface 321 of the second housing 320 face substantially the same first direction (z-axis direction) in an unfolded state, and the first surface 311 and the third surface 321 face each other in a folded state.

According to an embodiment, the electronic device 300 may be operated such that the second surface 312 of the first housing 310 and the fourth surface 322 of the second housing 320 face substantially the same second direction (−z-axis direction) in an unfolded state, and the second surface 312 and the fourth surface 322 face different directions in a folded state. For example, in a folded state, the second surface 312 may face the first direction (z-axis direction), and the fourth surface 322 may face the second direction (−z-axis direction).

According to various embodiments, the first housing 310 may include a first lateral frame 313 at least partially configuring an exterior of the electronic device 300, and a first rear cover 314 coupled to the first lateral frame 313 and configuring at least a part of the second surface 312 of the electronic device 300.

According to an embodiment, the first lateral frame 313 may include a first lateral surface 313*a*, a second lateral surface 313*b* extending from one end of the first lateral surface 313*a*, and a third lateral surface 313*c* extending from the other end of the first lateral surface 313*a*. According to an embodiment, the first lateral frame 313 may be configured to have a rectangular shape (e.g., square or rectangle) by the first lateral surface 313*a*, the second lateral surface 313*b*, and the third lateral surface 313*c*.

According to various embodiments, the second housing 320 may include a second lateral frame 323 at least partially configuring an exterior of the electronic device 300, and a second rear cover 324 coupled to the second lateral frame 323 and configuring at least a part of the fourth surface 322 of the electronic device 300.

According to an embodiment, the second lateral frame 323 may include a fourth lateral surface 323*a*, a fifth lateral surface 323*b* extending from one end of the fourth lateral surface 323*a*, and a sixth lateral surface 323*c* extending from the other end of the fourth lateral surface 323*b*. According to an embodiment, the second lateral frame 323 may be configured to have a rectangular shape by the fourth lateral surface 323*a*, the fifth lateral surface 323*b*, and the sixth lateral surface 323*c*.

According to various embodiments, the pair of housings 310 and 320 is not limited to the illustrated shape and coupling, and may be implemented by a combination and/or coupling of different shapes or components. For example, in an embodiment, the first lateral frame 313 may be integrated with the first rear cover 314, and the second lateral frame 323 may be integrated with the second rear cover 324.

According to various embodiments, in an unfolded state of the electronic device 300, the second lateral surface 313*b* of the first lateral frame 313 may be connected to the fifth lateral surface 323*b* of the second lateral frame 323 without any gap.

According to an embodiment, in an unfolded state of the electronic device 300, the third lateral surface 313*c* of the first lateral frame 313 may be connected to the sixth lateral surface 323*c* of the second lateral frame 323 without any gap.

According to an embodiment, the electronic device 300 may be configured in an unfolded state such that the sum length between the second lateral surface 313*b* and the fifth lateral surface 323*b* is greater than the length of the first lateral surface 313*a* and/or the fourth lateral surface 323*a*. According to an embodiment, the electronic device 300 may be configured such that the sum length between the third lateral surface 313*c* and the sixth lateral surface 323*c* is greater than the length of the first lateral surface 313*a* and/or the fourth lateral surface 323*a*.

According to various embodiments, the first lateral frame 313 and/or the second lateral frame 323 may be made of metal or may further include polymer injected to metal. According to an embodiment, the first lateral frame 313 and/or the second lateral frame 323 may include at least one conductive part 316 and/or 326 electrically partitioned through at least one partitioning part 3161 and 3162, and/or 3261 and 3262 made of polymer. According to an embodiment, the at least one conductive part may be electrically connected to a wireless communication circuit included in the electronic device 300 so as to be used as an antenna operating in at least one designated band (e.g., legacy band).

According to various embodiments, the first rear cover 314 and/or the second rear cover 324 may be made of, for example, at least one of coated or colored glass, ceramic, polymer, or metal (e.g., aluminum, stainless steel (STS), or magnesium), or a combination of two or more thereof.

According to various embodiments, the flexible display 330 may be disposed to extend from the first surface 311 of the first housing 310 to at least a part of the third surface 321 of the second housing 320 across the hinge module (e.g., the hinge module 340 in FIG. 5). For example, the flexible display 330 may include a first flat part 330*a* substantially corresponding to the first surface 311, a second flat part 330*b* corresponding to the second surface 321, and a bendable part 330*c* connecting the first flat part 330*a* and the second flat part 330*b* and corresponding to the hinge module (e.g., the hinge module 340 in FIG. 5).

According to an embodiment, the electronic device 300 may include a first protection cover 315 (e.g., a first protection frame or a first decoration member) coupled along an edge of the first housing 310.

According to an embodiment, the electronic device 300 may include a second protection cover 325 (e.g., a second protection frame or a second decoration member) coupled along an edge of the second housing 320.

According to an embodiment, the first protection cover 315 and/or the second protection cover 325 may be made of metal or a polymer material. According to an embodiment, the first protection cover 315 and/or the second protection cover 325 may be used as a decoration member.

According to an embodiment, the flexible display 330 may be positioned such that an edge of the first flat part 330*a* is interposed between the first housing 310 and the first protection cover 315. According to an embodiment, the flexible display 330 may be positioned such that an edge of the second flat part 330*b* is interposed between the second housing 320 and the second protection cover 325.

According to an embodiment, the flexible display 330 may be positioned such that an edge of the flexible display 330 corresponding to a protection cap (e.g., a protection cap 335 in FIG. 5) disposed in an area corresponding to the hinge module (e.g., the hinge module 340 in FIG. 5) is protected through the protection cap. For example, the edge of the flexible display 330 may be substantially protected from the outside.

According to an embodiment, the electronic device 300 may include a hinge housing 343 (e.g., a hinge cover). According to an embodiment, the hinge housing 343 may support the hinge module (e.g., the hinge module 340 in FIG. 5), may be exposed to the outside when the electronic device 300 is in a folded state, and may be disposed to be invisible from the outside by being inserted into a first space (e.g., a first space 501 in FIG. 5) and a second space (e.g., a second space 502 in FIG. 5) in an unfolded state.

According to various embodiments, the electronic device 300 may include a sub display 331 disposed separately from the flexible display 330. According to an embodiment, the sub display 331 may be disposed to be at least partially exposed (e.g., visible) on the second surface 312 of the first housing 310. According to an embodiment, in a case where the electronic device 300 is in a folded state, the sub display 331 may display state information of the electronic device 300 to substitute for a display function of the flexible display 330.

According to an embodiment, the sub display 331 may be disposed to be visible from the outside through at least a partial area of the first rear cover 314. In an embodiment, the sub display 331 may be disposed on the fourth surface 324 of the second housing 320. In this case, the sub display 331 may be disposed to be visible from the outside through at least a partial area of the second rear cover 324.

According to various embodiments, the electronic device 300 may include at least one of an input device 303 (e.g., a microphone), sound output devices 301 and 302, a sensor module 304, camera devices 305 and 308, a key input device 306, or a connector port 307. In the illustrated embodiment, the input device 303 (e.g., a microphone), the sound output devices 301 and 302, the sensor module 304, the camera devices 305 and 308, the key input device 306, or the connector port 307 indicates a hole or a shape disposed on the first housing 310 or the second housing 320. However, the above components (e.g., the input device 303 (e.g., a microphone), the sound output devices 301 and 302, the sensor module 304, the camera devices 305 and 308, the key input device 306, or the connector port 307) may include a substantial electronic component (e.g., an input device, a sound output device, a sensor module, or a camera device) disposed in the electronic device 300 and operating through the hole or shape.

According to various embodiments, the input device 303 may include at least one microphone 303 disposed on the second housing 320. In an embodiment, the input device 303 may include multiple microphones 303 arranged to detect the direction of sound. For example, the multiple microphones 303 may be disposed on a part of the first housing 310 and/or a part of the second housing 320.

According to an embodiment, the sound output devices 301 and 302 may include speakers 301 and 302. According to an embodiment, the speakers 301 and 302 may include a call receiver 301 disposed on the first housing 310 and the speaker 302 disposed on the second housing 320. In an embodiment, the input device 303, the sound output devices 301 and 302, and the connector port 307 may be arranged in a space configured by the first housing 310 and/or the second housing 320 of the electronic device 300, and may be exposed to an external environment through at least one hole disposed on the first housing 310 and/or the second housing 320.

According to an embodiment, the at least one connector port 307 may be used to transmit or receive power and/or data with an external electronic device. In an embodiment, the at least one connector port (e.g., an earphone jack) may also accommodate a connector (e.g., a plug) for transmitting or receiving an audio signal with an external electronic device. In an embodiment, a hole disposed on the first housing 310 and/or the second housing 320 may be used for both the input device 303 and the sound output devices 301 and 302. In an embodiment, the sound output devices 301 and 302 may further include a piezo speaker.

According to various embodiments, the sensor module 304 may generate an electrical signal or a data value corresponding to an internal operation state or an external environment state of the electronic device 300.

According to an embodiment, the sensor module 304 may detect an external environment through the first surface 311 of the first housing 310. In an embodiment, the electronic device 300 may further include at least one sensor module disposed to detect an external environment through the second surface 312 of the first housing 310.

According to an embodiment, the sensor module 304 (e.g., an illuminance sensor) may be disposed under the flexible display 330 (e.g., in the second direction (the −z-axis direction) from the flexible display 330), and may detect an external environment through the flexible display 330.

According to an embodiment, the sensor module 304 may include at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, a proximity sensor, a biometric sensor, an ultrasonic sensor, or an illuminance sensor 304.

According to various embodiments, the camera devices 305 and 308 may include a first camera device 305 (e.g., a front camera device) disposed on the first surface 311 of the first housing 310, and a second camera device 308 disposed on the second surface 312 of the first housing 310.

According to an embodiment, the electronic device 300 may further include a flash 309 disposed near the second camera device 308. According to an embodiment, the camera devices 305 and 308 may include one or multiple lenses, an image sensor, and/or an image signal processor.

According to an embodiment, the flash 309 may include a light emitting diode or a xenon lamp.

According to an embodiment, the camera devices 305 and 308 may be disposed such that two or more lenses (e.g., a wide-angle lens, an ultra wide-angle lens, or a telephoto lens) and image sensors are positioned on one surface (e.g., the first surface 311, the second surface 312, the third surface 321, or the fourth surface 322) of the electronic device 300. In an embodiment, the camera devices 305 and 308 may include time-of-flight (TOF) lenses and/or an image sensor.

According to various embodiments, the key input device 306 (e.g., a key button) may be disposed on the third lateral surface 313*c* of the first lateral frame 313 of the first housing 310. In an embodiment, the key input device 306 may be disposed on at least one lateral surface among different lateral surfaces 313*a* and 313*b* of the first housing 310 and/or the lateral surfaces 323*a*, 323*b*, and 323*c* of the second housing 320. In an embodiment, the electronic device 300 may not include some or all of the key input devices 306, and the key input device 306 that is not included may be implemented in a different type such as a soft key on the flexible display 330. In an embodiment, the key input device 306 may be implemented using a pressure sensor included in the flexible display 330.

According to various embodiments, some camera devices 305 among the camera devices 305 and 308 or the sensor module 304 may be disposed to be exposed through the flexible display 330. For example, the first camera device 305 or the sensor module 304 may be disposed to come into contact with an external environment through an opening (e.g., a through hole) at least partially disposed on the flexible display 330 in an inner space of the electronic device 300. In an embodiment, some camera devices 305 among the camera devices 305 and 308 or the sensor module 304 may be disposed to perform a function thereof without being visually exposed through the flexible display 330 in the inner space of the electronic device 300. For example, in this case, the flexible display 330 may not have an opening disposed in an area facing camera devices 305 or the sensor module 304.

Referring to FIG. 3B, the electronic device 300 according to an embodiment may be operated to maintain an intermediate state through the hinge module (e.g., the hinge module 340 in FIG. 5). In this case, the electronic device 300 may control the flexible display 330 to display different contents in a display area corresponding to the first surface 311 and a display area corresponding to the third surface 321.

According to an embodiment, the electronic device 300 may be operated in a substantially unfolded state (e.g., an unfolded state in FIG. 3A) and/or a substantially folded state (e.g., a folded state in FIG. 4A) with respect to a particular inflection angle (e.g., the angle between the first housing 310 and the second housing 320 in an intermediate state) through the hinge module (e.g., the hinge module 340 in FIG. 5). For example, the electronic device 300 may be operated to transition to an unfolded state (e.g., an unfolded state in FIG. 3A) in a case where a pressure is applied in an unfolding direction (B direction) in a state where the electronic device is unfolded to the particular inflection angle, through the hinge module (e.g., the hinge module 340 in FIG. 5). For example, the electronic device 300 may be operated to transition to a close state (e.g., the folded state in FIG. 2A) in a case where a pressure is applied in a folding direction (C direction) in a state where the electronic device is unfolded to the particular inflection angle through the hinge module (e.g., the hinge module 340 in FIG. 5). In an embodiment, the electronic device 300 may be operated to maintain an unfolded state (not illustrated) at various angles through the hinge module (e.g., the hinge module 340 in FIG. 5).

FIG. 5 is an exploded perspective view of an electronic device according to various embodiments. For example, FIG. 5 may be an exploded perspective view of the electronic device 300 illustrated in FIG. 3A to FIG. 4B.

Referring to FIG. 5, the electronic device 300 according to an embodiment may include the first lateral frame 313, the second lateral frame 323, and the hinge module 340 connecting the first lateral frame 313 and the second lateral frame 323 to be rotatable.

According to an embodiment, the electronic device 300 may include a first support plate 3131 at least partially extending from the first lateral frame 313, and a second support plate 3231 at least partially extending from the second lateral frame 323.

According to an embodiment, the first support plate 3131 may be integrated with the first lateral frame 313 or may be structurally coupled to the first lateral frame 313. According to an embodiment, the second support plate 3231 may be integrated with the second lateral frame 323 or may be structurally coupled to the second lateral frame 323.

According to an embodiment, the flexible display 330 may be disposed to be supported by the first support plate 3131 and the second support plate 3231.

According to an embodiment, the electronic device 300 may include the first rear cover 314 and the second rear cover 324. According to an embodiment, the first rear cover 314 may be coupled to the first lateral frame 313 and provide the first space 501 between same and the first support plate 3131. According to an embodiment, the second rear cover 324 may be coupled to the first rear cover 314 and the second lateral frame 323 and provide the second space 502 between same and the second support plate 3231.

According to an embodiment, the first lateral frame 313 and the first rear cover 314 may be integrally configured. According to an embodiment, the second lateral frame 323 and the second rear cover 324 may be integrally configured.

According to an embodiment, the first housing 310 (e.g., the first housing 310 in FIG. 3A) (e.g., the first housing structure) of the electronic device 300 may include the first lateral frame 313, the first support plate 3131, and the first rear cover 314.

According to an embodiment, the second housing (e.g., the second housing 320 in FIG. 3A) (e.g., the second housing structure) of the electronic device 300 may include the second lateral frame 323, the second support plate 3231, and the second rear cover 324.

According to an embodiment, the sub display 331 of the electronic device 300 may be disposed to be visible from the outside through at least a partial area of the first rear cover 314.

According to various embodiments, in the electronic device 300, a first substrate assembly 361 (e.g., a main printed circuit board), a camera assembly 363, a first battery 371, or a first bracket 351 may be disposed in the first space 501 between the first lateral frame 313 and the first rear cover 314. According to an embodiment, a second flexible circuit board 830 including a second antenna member 392 may be disposed in the first space 501. For example, the second antenna member 392 may include a second MST antenna (e.g., a second MST antenna 712 in FIG. 7) and/or a second NFC antenna (e.g., a second NFC antenna 612 in FIG. 6). In this disclosure, the second antenna member 392 may include a "sub antenna member". The second antenna member 392 will be described later in detail with reference to FIG. 6 to FIG. 10.

According to an embodiment, the camera assembly 363 may include multiple camera devices (e.g., the camera devices 305 and 308 in FIG. 3A and FIG. 4A), and may be electrically connected to the first substrate assembly 361.

According to an embodiment, the first bracket 351 may provide a support structure and an improved stiffness to support the first substrate assembly 361 and/or the camera assembly 363.

According to an embodiment, in the electronic device 300, a second substrate assembly 362 (e.g., a sub printed circuit board), a second battery 372, or a second bracket 352 may be disposed in the second space 502 between the second lateral frame 323 and the second rear cover 324. According to an embodiment, a first flexible circuit board 820 including a first antenna member 391 may be disposed in the second space 502. According to an embodiment, the first antenna member 391 may include a first MST antenna (e.g., a first MST antenna 711 in FIG. 7), a first NFC antenna (e.g., an NFC antenna 611 in FIG. 6), and/or a wireless charging antenna (e.g., a wireless charging antenna 297-5 in FIG. 10). In this disclosure, the first antenna member 391 may include a "main antenna member". According to an embodiment, the first flexible circuit board 820 including the first antenna member 391 may be electrically connected to the second flexible circuit board 830 including the second antenna member 392 through a wire connection member 380.

According to an embodiment, the electronic device 300 may include the wire connection member 380 (e.g., a flexible circuit board (flexible printed circuit board (FPCB))). According to an embodiment, the wire connection member 380 may be disposed to extend from the first substrate assembly 361, across the hinge module 340, to multiple electronic components (e.g., the second substrate assembly 362, the second battery 372, or an antenna 390) arranged between the second lateral frame 323 and the second rear cover 324, and may provide an electrical connection. In this disclosure, the first antenna member 391 may include a "main antenna member".

According to an embodiment, the antenna 390 may include a near field communication (NFC) antenna, a wireless charging antenna, and/or a magnetic secure transmission (MST) antenna. For example, the antenna 390 may perform short-range communication with an external device, or wirelessly transmit or receive power required for charging.

According to various embodiments, the electronic device 300 may include the hinge housing 343 (e.g., a hinge cover). For example, the hinge housing 343 may support the hinge module 340, may be exposed to the outside when the electronic device 300 is in a folded state (e.g., a folded state in FIG. 4A), and may be disposed to be invisible from the outside by being inserted into the first space 501 and/or the second space 502 in an unfolded state (e.g., an unfolded state in FIG. 3A).

According to various embodiments, the electronic device 300 may include the first protection cover 315 coupled along an edge of the first lateral frame 313, and the second protection cover 325 coupled along an edge of the second lateral frame 323.

According to an embodiment, an edge of the first flat part (e.g., the first flat part 330*a* in FIG. 3B) of the flexible display 330 may be protected by the first protection cover 315. According to an embodiment, an edge of the second flat part (e.g., the second flat part 330*b* in FIG. 3B) of the flexible display 330 may be protected by the second protection cover 325.

According to an embodiment, the electronic device 300 may include the protection cap 335 disposed to protect an edge of the bendable part (e.g., the bendable part 330*c* in FIG. 3B) corresponding to the hinge module 340 of the flexible display.

An electronic device (e.g., the electronic device 300 in FIG. 3A) according to various example embodiments of the disclosure may include: a hinge module comprising a hinge (e.g., the hinge module 340 in FIG. 5); a foldable housing coupled to the hinge module and including a first housing (e.g., the first housing 310 in FIG. 3A) including a first surface facing a first direction and a second surface facing a second direction opposite to the first surface in an unfolded state, and a second housing (e.g., the second housing 320 in FIG. 3A) including a third surface facing the first direction and a fourth surface facing the second direction in an unfolded state, wherein the first surface and the third surface face each other in a folded state; a first coil (e.g., the first NFC antenna 611 in FIG. 10) positioned in the second housing and including a specified n number of turns; a second coil (e.g., the second NFC antenna 612 in FIG. 10) positioned in the first housing and including a designated m number of turns less than n turns, and connected in series to the first coil; a communication module comprising communication circuitry (e.g., the NFC communication module 230 in FIG. 2) electrically connected to the first coil and the second coil; and a processor (e.g., the processor 120 in FIG. 1) configured to control the communication module.

According to an example embodiment, the electronic device may further include: the main printed circuit board including the communication module and positioned in the first housing; the first flexible circuit board including the first coil and positioned in the second housing; the second flexible circuit board including the second coil and electrically connected to the main printed circuit board in the first housing; and a wire connection member comprising at least one wire disposed to cross over the hinge module to extend from inside the first housing to inside the second housing, and electrically connecting the main printed circuit board and the second flexible circuit board to each other.

According to an example embodiment, the main printed circuit board may include: a first socket fastened to a first connector of the wire connection member; a second socket fastened to a third connector of the second flexible circuit board; and at least one wire connecting the first socket and the second socket.

According to an example embodiment, the first coil and the second coil may be connected in series to each other through the wire connection member, the first socket, the at least one wire, and the second socket.

According to an example embodiment, the first flexible circuit board may further include a first shielding sheet, the second flexible circuit board may further include a second shielding sheet, and a thickness of the first shielding sheet may be greater than a thickness of the second shielding sheet.

According to an example embodiment, the first shielding sheet may include three or more stacked first shielding sheets, and the second shielding sheet may include one second shielding sheet or two stacked second shielding sheets.

According to an example embodiment, an area of the first shielding sheet may be greater than an area of the second shielding sheet.

According to an example embodiment, an area of the first coil may be greater than an area of the second coil.

According to an example embodiment, the first coil may include an NFC main antenna configured to resonate in a 13.56 MHz band, and the second coil may include an NFC sub antenna configured to resonate in a 12 MHz band.

According to an example embodiment, the first coil may include a multi-layer coil disposed on a multi-layer, and the second coil may include a single layer coil disposed on a single layer.

According to an example embodiment, the wire connection member may comprise a flexible circuit board fastened to the main printed circuit board and the second flexible circuit board in a connector-to-connector scheme.

According to an example embodiment, the wire connection member may include multiple wires including an NFC wire including a line configured to transmit an NFC signal related to the first coil and the second coil, and the NFC wire may be disposed as an outermost wire among the multiple wires.

According to an example embodiment, the NFC wire of the wire connection member may be disposed on a single layer.

According to an example embodiment, the NFC wire of the wire connection member may be disposed on a multi-layer.

According to an example embodiment, the first coil may be configured to generate a magnetic field substantially in the second direction in the folded state of the foldable housing, and the second coil may be configured to generate a magnetic field substantially in the first direction in the folded state of the foldable housing.

According to an example embodiment, the first coil may be configured to generate a magnetic field substantially in the second direction in the unfolded state of the foldable housing, and the second coil may be configured to generate a magnetic field substantially in the first direction in the unfolded state of the foldable housing.

The electronic device according to various example embodiments of the disclosure may include: a hinge module including a hinge; a foldable housing coupled to the hinge module, including the first housing including a first surface facing a first direction and a second surface facing a second direction opposite to the first surface in an unfolded state, and a second housing including a third surface facing the first direction and a fourth surface facing the second direction in an unfolded state, and configured to operate such that the first surface and the third surface face each other in a folded state; a first NFC antenna (e.g., the first NFC antenna 611 in FIG. 10) positioned in the second housing and including a specified n number of turns; a second NFC antenna (e.g., the second NFC antenna 612 in FIG. 10) positioned in the first housing, and including a designated m number of turns less than n turns, and connected in series to the first NFC antenna; a communication module comprising communication circuitry electrically connected to the first NFC antenna and the second NFC antenna; and a processor configured to control the communication module.

According to an example embodiment, the electronic device may further include: a main printed circuit board including the communication module and positioned in the first housing; a first flexible circuit board including the first NFC antenna and positioned in the second housing; a second flexible circuit board including the second NFC antenna and electrically connected to the main printed circuit board in the first housing; and a wire connection member including at least one wire disposed to cross over the hinge module to extend from inside the first housing to inside the second housing, and electrically connecting the main printed circuit board and the second flexible circuit board to each other.

According to an example embodiment, the main printed circuit board may include: a first socket fastened to a first connector of the wire connection member; a second socket fastened to a third connector of the second flexible circuit board; and at least one wire connecting the first socket and the second socket.

According to an example embodiment, the first NFC antenna and the second NFC antenna may be connected in series to each other through the wire connection member, the first socket, the at least one wire, and the second socket.

Figure 6:
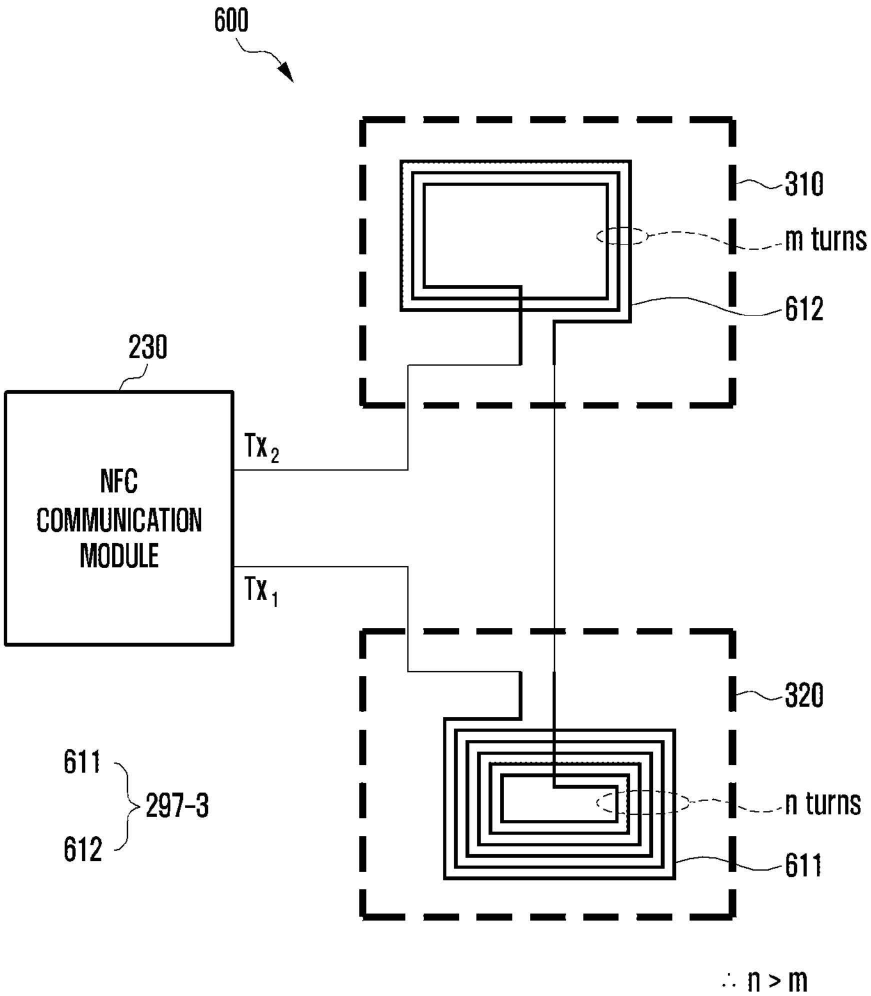
FIG. 6 is a block diagram illustrating an example configuration of an NFC communication module and an NFC antenna of an electronic device according to various embodiments.

FIG. 6 is a block diagram 600 illustrating an example configuration of an NFC communication module (e.g., the NFC communication module 230) and an NFC antenna of an electronic device (e.g., the electronic device 300 in FIG. 3) according to various embodiments.

Referring to FIG. 6, the electronic device 300 according to an embodiment may include the NFC communication module 230 and an NFC antenna (e.g., the NFC antenna 297-3 in FIG. 2) electrically connected to the NFC communication module 230.

According to an embodiment, the NFC antenna 297-3 may include the first NFC antenna 611 (e.g., a main NFC antenna) disposed in the second housing 320 and the second NFC antenna 612 (e.g., a sub NFC antenna) disposed in the first housing 310. According to an embodiment, the NFC communication module 230 may be disposed on the first substrate assembly 361 (e.g., a main printed circuit board 810) disposed in the first housing 310, and the first NFC antenna 611 disposed in the second housing 320 may be electrically connected to the NFC communication module 230 through a wire connection member (e.g., a wire connection member 840 in FIG. 10 or the wire connection member 380 in FIG. 5).

According to an embodiment, the first NFC antenna 611 may include a first coil having a loop shape. According to an embodiment, one end of the first coil may be electrically connected to a first output terminal Tx1 of the NFC communication module 230 through the wire connection member 840. According to an embodiment, the other end of the first coil may be electrically connected to one end of the second NFC antenna 612 through the wire connection member 840. According to an embodiment, the first NFC antenna 611 may include a designated n number of turns.

According to an embodiment, the second NFC antenna 612 may include a second coil having a loop shape. According to an embodiment, one end of the second coil may be electrically connected to the other end of the first NFC antenna (e.g., the first coil) through the wire connection member 840. According to an embodiment, the other end of the second coil may be electrically connected to a second output terminal Tx2 of the NFC communication module 230.

According to an embodiment, the number of turns of the second coil may be equal to or less than the number of turns of the first coil. For example, the first coil may include a designated (e.g., specified) n number of turns, and the second coil may include m number of turns equal to or less than n turns. In an embodiment, the number of turns of the second coil may be less than the number of turns of the first coil. For example, the first coil may include a designated n number of turns, and the second coil may include m number of turns less than n turns.

According to the illustrated embodiment, the first NFC antenna 611 and the second NFC antenna 612 may be connected in series to each other. For example, the electronic device 300 may include the NFC antenna 297-3 having a 2-coil 1-loop structure in which one loop is configured using two coil connected in series to each other. In the electronic device 300 according to various embodiments, the first NFC antenna 611 and the second NFC antenna 612 are connected in series with each other, whereby flow of overcurrent through the coil may be prevented and/or reduced and performance degradation of the antenna may be prevented and/or reduced. For example, in a case where the first NFC antenna 611 and the second NFC antenna 612 are connected in parallel, overcurrent may flow in the coil due to resistance reduction of the coil, and the performance of the NFC antenna 297-3 may degrade. In the electronic device 300 according to various embodiments, the first NFC antenna 611 and the second NFC antenna 612 are connected in series to each other, whereby separate flowing of different currents to the first NFC antenna 611 and the second NFC antenna 612 are prevented and/or reduced, and thus performance degradation of the antenna may be prevented and/or reduced. In the disclosure, a structure in which the first NFC antenna 611 and the second NFC antenna 612 are connected in series with each other will be described in greater detail below with reference to FIG. 8.

Figure 7:
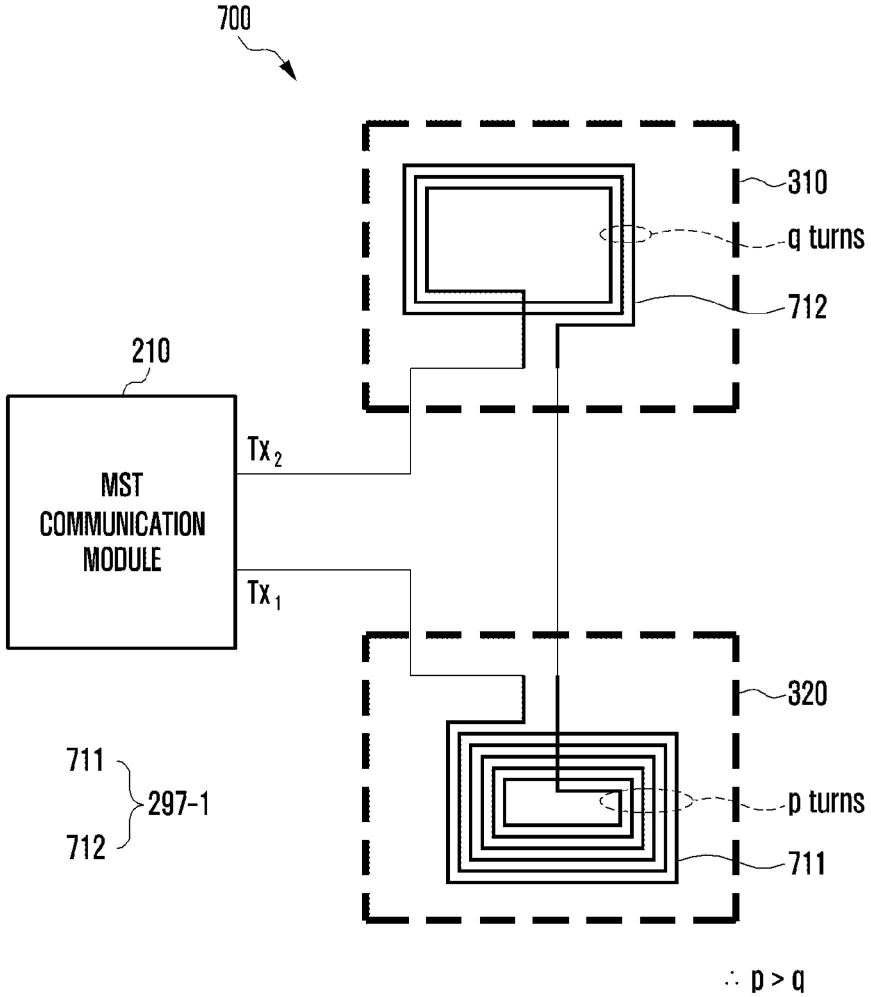
FIG. 7 is a block diagram illustrating an example configuration of an MST communication module and an MST antenna of an electronic device according to various embodiments.

FIG. 7 is a block diagram 700 illustrating an example configuration of an MST communication module (e.g., the MST communication module 210 in FIG. 2) and an MST antenna (e.g., the MST antenna 297-1 in FIG. 2) of the electronic device 300 (e.g., the electronic device 300 in FIG. 3) according to various embodiments.

Referring to FIG. 7, the electronic device 300 according to an embodiment may include the MST communication module 210 and the MST antenna 297-1 electrically connected to the MST communication module 210.

According to an embodiment, the MST antenna 297-1 may include the first MST antenna 711 (e.g., a main MST antenna) disposed in the second housing 320 and the second MST antenna 712 (e.g., a sub MST antenna) disposed in the first housing 310. According to an embodiment, the MST communication module 210 may be disposed on the first substrate assembly (e.g., the first substrate assembly 361 in FIG. 5) (e.g., the main printed circuit board 810 in FIG. 10) disposed in the first housing 310, and the first MST antenna 711 disposed in the second housing 320 may be electrically connected to the MST communication module 210 through the wire connection member 840 (e.g., the wire connection member 840 in FIG. 10).

According to an embodiment, the first MST antenna 711 may include a third coil having a loop shape. According to an embodiment, one end of the third coil may be electrically connected to a first output terminal Tx1 of the MST communication module 210 through the wire connection member 840. According to an embodiment, the other end of the third coil may be electrically connected to one end of the second MST antenna 712 (e.g., a fourth coil) through the wire connection member 840. According to an embodiment, the first MST antenna 711 may include a designated (e.g., specified) p number of turns.

According to an embodiment, the second MST antenna 712 may include a fourth coil having a loop shape. According to an embodiment, one end of the fourth coil may be electrically connected to the other end of the first MST antenna 711 (e.g., the third coil) through the wire connection member 840. According to an embodiment, the other end of the fourth coil may be electrically connected to a second output terminal Tx2 of the MST communication module 210.

According to an embodiment, the number of turns of the fourth coil may be equal to or less than the number of turns of the third coil. For example, the third coil may include a designated p number of turns, and the fourth coil may include q number of turns equal to or less than p turns. In an embodiment, the number of turns of the fourth coil may be less than the number of turns of the third coil. For example, the third coil may include a designated p number of turns, and the fourth coil may include q number of turns less than p turns.

According to the illustrated embodiment, the first MST antenna 711 and the second MST antenna 712 may be connected in series to each other. For example, the electronic device 300 may include the MST antenna 297-1 having a 2-coil 1-loop structure in which one loop is configured using two coil connected in series to each other. In the electronic device 300 according to various embodiments, the first MST antenna 711 and the second MST antenna 712 are connected in series with each other, whereby flow of overcurrent through the coil may be prevented and/or reduced and performance degradation of the antenna may be prevented and/or reduced. For example, in a case where the first MST antenna 711 and the second MST antenna 712 are connected in parallel, overcurrent may flow in the MST coil 297-1 due to resistance reduction of the coil, and the performance of the MST antenna (MST) may degrade. In the disclosure, a structure in which the first MST antenna 711 and the second MST antenna 712 are connected in series with each other will be described in greater detail below with reference to FIG. 9. According to various embodiments, the MST communication module 210 illustrated in FIG. 7 and the NFC communication module 230 illustrated in FIG. 6 may be implemented as one IC.

Figure 8:
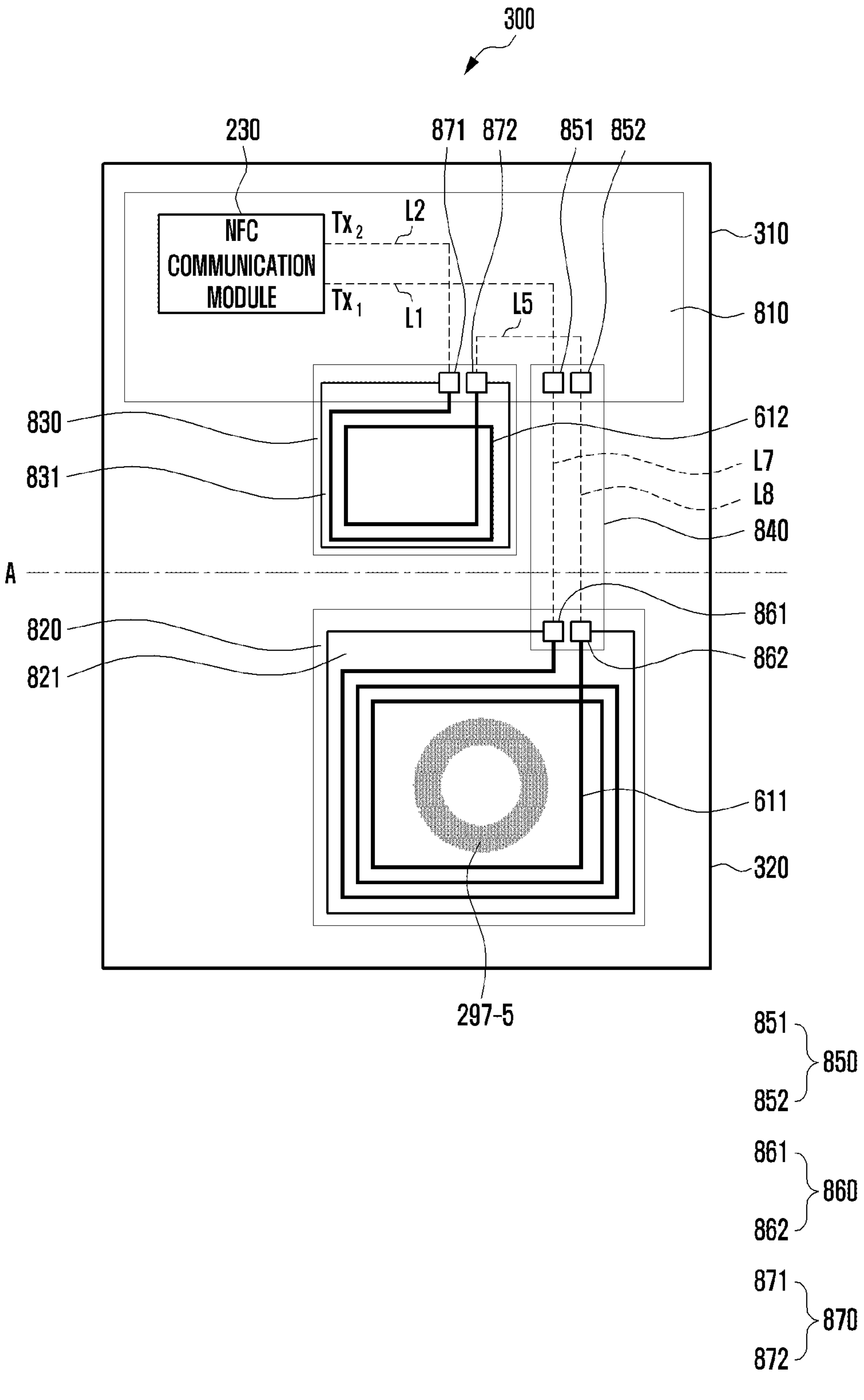
FIG. 8 is an diagram illustrating an arrangement structure of an NFC module and an NFC antenna of an electronic device according to various embodiments.

FIG. 8 is diagram illustrating an example arrangement structure of an NFC module and an NFC antenna of the electronic device 300 (e.g., the electronic device 300 in FIG. 3) according to various embodiments.

Figure 9:
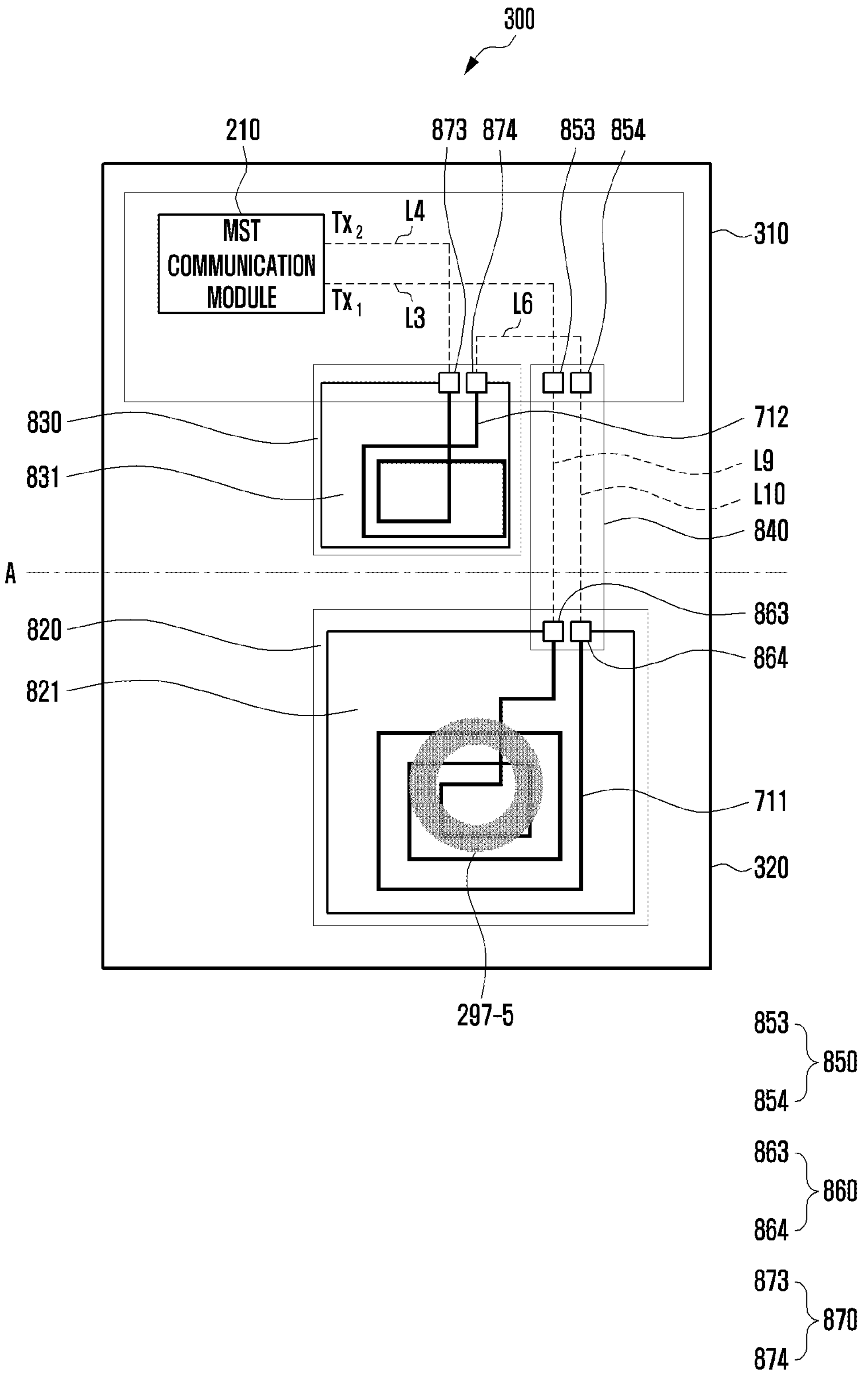
FIG. 9 is an diagram illustrating an arrangement structure of an MST communication module and an MST antenna of an electronic device according to various embodiments.

FIG. 9 is a diagram illustrating an example arrangement structure of an MST communication module (e.g., the MST communication module 210 in FIG. 2) and an MST antenna (e.g., the MST antenna 297-1 in FIG. 2) of the electronic device 300 (e.g., the electronic device 300 in FIG. 3) according to various embodiments.

Referring to FIG. 8 and FIG. 9, the electronic device 300 according to an embodiment may include the main printed circuit board 810 (e.g., the first substrate assembly 361 in FIG. 5), the first flexible circuit board 820, the second flexible circuit board 830, and the wire connection member 840 (e.g., the wire connection member 380 in FIG. 5).

According to an embodiment, the main printed circuit board 810 and the second flexible circuit board 830 may be arranged in the first housing 310. For example, the main printed circuit board 810 and the second flexible circuit board 830 may be arranged in the first space 501 (e.g., the first space 501 in FIG. 5) provided by the first housing 310.

According to an embodiment, the first flexible circuit board 820 may be disposed in the second housing 320. For example, the first flexible circuit board 820 may be disposed in the second space 502 (e.g., the second space 502 in FIG. 5) provided by the second housing 320.

According to an embodiment, the main printed circuit board 810 may include the NFC communication module 230 (e.g., the NFC communication module 230 in FIG. 2) and the MST communication module 210 (e.g., MST communication module 210 in FIG. 2). According to an embodiment, the main printed circuit board 810 may further include the wireless charging module 250 (e.g., the wireless charging module 250 in FIG. 2 or FIG. 10).

In the disclosure, an element for electrically connecting at least two elements may be collectively referred to as a connector. A connector may be classified as a female connector and a male connector. A male connector may be fitted into a female connector. Therefore, a male connector is configured to be fitted into a female connector, and a female connector may be configured to accommodate a male connector. Fitted insertion between a male connector and a female connector may be performed in various schemes. For example, a male connector may be fittedly inserted in a female connector in a clip scheme. When a male connector is fitted into a female connector, multiple terminals included in the male connector and multiple terminals included in the female connector may come into contact with each other and be electrically connected. The term "male connector" may be replaced with a term, such as a plug or head, and the term "female connector" may be replaced with a term such as a receptacle or socket. Hereinafter, a male connector may be referred to, for example, as a "connector", and a female connector may be referred to, for example, as a "socket member". In a drawings, a connector disposed on the main printed circuit board 810 is illustrated as a female connector. However, it is also possible to change the connector disposed on the main printed circuit board 810 to a male connector and determine the connector of the wire connection member 840 to a female connector.

According to an embodiment, the main printed circuit board 810 may be electrically connected to the wire connection member 840 in a connector fastening scheme (e.g., a connector-to-connector scheme). According to an embodiment, the wire connection member 840 may include multiple connectors (e.g., first connectors 842 and 843 and a second connector 841 in FIG. 10), and a connector fastened to the main printed circuit board 810 among the multiple connectors may include the "first connectors 842 and 843 (e.g., the first connectors 842 and 843 in FIG. 10)". According to an embodiment, the main printed circuit board 810 may include at least one first socket member 850 fastened to the first connectors 842 and 843 of the wire connection member 840. According to an embodiment, the first socket member (e.g., socket) 850 may include multiple pads (or pins) fastened to the first connectors 842 and 843 in a male-female type. For example, the first socket member 850 may include a first pad 851 and a second pad 852 illustrated in FIG. 8, and a third pad 853 and a fourth pad 854 illustrated in FIG. 9. According to an embodiment, the first socket member 850 may further include at least one dummy pad not illustrated, and the dummy pad may be configured to transfer a power signal or a control signal. In this disclosure, the mentioned dummy pad does not indicate a pad not used, and may refer, for example, to pads not related to various embodiments of the disclosure. For example, dummy pads may be referred to, for example, using a term such as a power pad or a control signal pad.

According to an embodiment, the wire connection member 840 may include a connector fastened to the first flexible circuit board 820, and the connector may include the "second connector 841 (e.g., the second connector 841 in FIG. 10)". According to an embodiment, the main printed circuit board 810 may be electrically connected to the first flexible circuit board 820 by being fastened to the wire connection member 840. According to an embodiment, the main printed circuit board 810 may transmit or receive a high-frequency signal, a power signal, a control signal, and/or a data signal to or from the first flexible circuit board 820 through the wire connection member 840.

According to an embodiment, the main printed circuit board 810 may be electrically connected to the second flexible circuit board 830 in a connector fastening scheme. According to an embodiment, the second flexible circuit board 830 may include at least one connector fastened to the main printed circuit board 810, and the at least one connector may be referred to, for example, as a "third connector 832 (e.g., the third connector 832 in FIG. 10)". According to an embodiment, the main printed circuit board 810 may include at least one second socket member 870 fastened to the third connector 832 of the second flexible circuit board 830. According to an embodiment, the second socket member 870 may include multiple pads (or pins). For example, the second socket member 870 may include a fifth pad 871 and a sixth pad 872 illustrated in FIG. 8, and a seventh pad 873 and an eighth pad 874 illustrated in FIG. 9. According to an embodiment, the second socket member 870 may further include at least one dummy pad not illustrated, and the dummy pad may be configured to transfer a power signal or a control signal.

According to the illustrated example, the first pad 851 and the second pad 852 in FIG. 8 and the third pad 853 and the fourth pad 854 in FIG. 9 may be referred to, for example, as "a part of the first socket member 850" fastened to the first connectors 842 and 843 of the wire connection member 840.

According to the illustrated example, the fifth pad 871 and the sixth pad 872 in FIG. 8 and the seventh pad 873 and the eighth pad 874 in FIG. 9 may be referred to, for example, as "a part of the second socket member 870" fastened to the third connector 832 of the second flexible circuit board 830.

According to the illustrated example, a ninth pad 861 and a tenth pad 862 in FIG. 8 and an eleventh pad 863 and a twelfth pad 864 in FIG. 9 may be referred to, for example, as "a part of a third socket member 860 of the first flexible circuit board 820" fastened to the second connector 841 of the wire connection member 840.

According to various embodiments, the main printed circuit board 810 may include multiple wires. According to an embodiment, the multiple wires may connect the NFC communication module 230 and the first socket member 850, connect the MST communication module 210 and the second socket member 870, or connect the first socket member 850 and the second socket member 870.

According to an embodiment, the main printed circuit board 810 may include at least one wire connecting the NFC communication module 230 to a part of the first socket member 850. For example, as illustrated in FIG. 8, the main printed circuit board 810 may include a first wire L1 connecting the first output terminal Tx1 of the NFC communication module 230 to the first pad 851. For example, the first wire L1 of the main printed circuit board 810 may be disposed to extend from the first output terminal Tx1 of the NFC communication module 230 to the first pad 851.

According to an embodiment, the main printed circuit board 810 may include at least one wire connecting the NFC communication module 230 to a part of the second socket member 870. For example, as illustrated in FIG. 8, the main printed circuit board 810 may include a second wire L2 connecting the second output terminal Tx2 of the NFC communication module 230 to the fifth pad 871. For example, the second wire L2 of the main printed circuit board 810 may be disposed to extend from the second output terminal Tx2 of the NFC communication module 230 to the fifth pad 871.

According to an embodiment, the main printed circuit board 810 may include at least one wire connecting the MST communication module 210 to the first socket member 850. For example, as illustrated in FIG. 9, the main printed circuit board 810 may include a third wire L3 connecting the first output terminal Tx1 of the MST communication module 210 to the third pad 853. For example, the third wire L3 of the main printed circuit board 810 may be disposed to extend from the first output terminal Tx1 of the MST communication module 210 to the third pad 853.

According to an embodiment, the main printed circuit board 810 may include at least one wire connecting the MST communication module 210 to the second socket member 870. For example, as illustrated in FIG. 9, the main printed circuit board 810 may include a fourth wire L4 connecting the second output terminal Tx2 of the MST communication module 210 to the seventh pad 873. For example, the fourth wire L4 of the main printed circuit board 810 may be disposed to extend from the second output terminal Tx2 of the MST communication module 210 to the seventh pad 873.

According to an embodiment, the main printed circuit board 810 may include at least one wire connecting the first socket member 850 to the second socket member 870. According to an embodiment, the main printed circuit board 810 may include a fifth wire L5 connecting the second pad 852 to the sixth pad 872, as illustrated in FIG. 8. According to an embodiment, the main printed circuit board 810 may further include a sixth wire L6 connecting the fourth pad 854 to the eighth pad 874, as illustrated in FIG. 9.

According to an embodiment, the wire connection member 840 may be configured to extend from the first space 501 arranged by the first housing 310 to the second space 502 arranged by the second housing 320. According to an embodiment, the first connectors 842 and 843 of the wire connection member 840 may be fastened to the first socket member 850 of the main printed circuit board 810 in the first space 501, and the second connector 841 of the wire connection member 840 may be fastened to the third socket member 860 of the first flexible circuit board 820 in the second space 502. According to an embodiment, the wire connection member 840 may include multiple wires to electrically (or by signal) connect the main printed circuit board 810 and the first flexible circuit board 820.

According to an embodiment, the wire connection member 840 may extend to cross over the folding axis (axis A) of the first housing 310 and the second housing 320. For example, the wire connection member 840 may extend to cross over the hinge module 340 (e.g., the hinge module 340 in FIG. 5).

According to an embodiment, the wire connection member 840 may include multiple wires connecting the first socket member 850 of the main printed circuit board 810 and the third socket member 860 of the first flexible circuit board 820. According to an embodiment, the multiple wires of the wire connection member 840 may be lines transmitting a high-frequency signal, a power signal, a control signal, and/or a data signal.

According to an embodiment, the wire connection member 840 may include a seventh wire L7 and an eighth wire L8 extending to cross over the folding axis (axis A) and transmitting an NFC signal related to NFC communication. For example, as illustrated in FIG. 8, the seventh wire L7 of the wire connection member 840 may connect the first pad 851 of the main printed circuit board 810 to the ninth pad 861 of the first flexible circuit board 820, and the eighth wire L8 may connect the second pad 852 of the main printed circuit board 810 to the tenth pad 862 of the first flexible circuit board 820. In the disclosure, the seventh wire L7 and the eighth wire L8 may be referred to, for example, as NFC wires that are lines transmitting an NFC signal. According to an embodiment, the NFC wire of the wire connection member 840 may be disposed on a single layer. According to an embodiment, the NFC wire of the wire connection member 840 may be disposed on a multi-layer.

According to an embodiment, the wire connection member 840 may include a ninth wire L9 and a tenth wire L10 extending to cross over the folding axis (axis A) and transmitting an MST signal related to MST communication. For example, as illustrated in FIG. 9, the ninth wire L9 of the wire connection member 840 may connect the third pad 853 of the main printed circuit board 810 to the eleventh pad 863 of the first flexible circuit board 820, and the tenth wire L10 may connect the fourth pad 854 of the main printed circuit board 810 to the twelfth pad 864 of the first flexible circuit board 820. According to various embodiments, the first wire L1 and the second wire L2 of the main printed circuit board 810 may be connected to a matching device (not illustrated) for NFC communication. For example, the matching device for NFC communication may be included in the NFC communication module 230.

According to an embodiment, the first flexible circuit board 820 may include the first antenna member 391 (e.g., the first antenna member 391 in FIG. 5). According to an embodiment, the first antenna member 391 may include the first NFC antenna 611 as illustrated in FIG. 8. According to an embodiment, the first antenna member 391 may further include the first MST antenna 711 as illustrated in FIG. 9. According to an embodiment, the first antenna member 391 may further include the wireless charging antenna 297-5.

According to an embodiment, the first flexible circuit board 820 may further include a heat dissipation member (not illustrated) (e.g., a graphite sheet) for preventing/reducing thermal diffusion or a first shielding member 821 (e.g., a shielding sheet) for preventing/reducing damage to a different component due to a strong induced electromagnetic field, and a protection film (not illustrated) for preventing/reducing damage. The first shielding member 821 may include three or more stacked first shielding sheets.

According to an embodiment, at least a part of the first flexible circuit board 820 including the first NFC antenna 611, the first MST antenna 711, and the wireless charging antenna 297-5 may be arranged on different layers. For example, the first NFC antenna 611 may be disposed on a first layer of the first flexible circuit board 820, the first MST antenna 711 may be disposed on a second layer of the first flexible circuit board 820, and the wireless charging antenna 297-5 may be disposed on a third layer. According to an embodiment, the first to third layers may be different layers. According to an embodiment, at least some of the first to third layers may be the same layer. For example, the first layer on which the first NFC antenna 611 is disposed and the second layer on which the first MST antenna 711 is disposed are the same layer, and the first layer and the third layer may be different layers. In this case, the first NFC antenna 611 and the second NFC antenna 612 may be arranged on the same layer while not overlapping with each other. According to an embodiment, at least a part of the first flexible circuit board 820 including the first NFC antenna 611, the first MST antenna 711, and the wireless charging antenna 297-5 may be arranged on multiple layers rather than a single layer.

Referring to FIG. 8, the first NFC antenna 611 may include the first coil having a loop shape. According to an embodiment, the first coil may be connected to the third socket member 860 of the first flexible circuit board 820 fastened to the wire connection member 840. According to an embodiment, one end of the first coil may be connected to the ninth pad 861, and the other end of the first coil may be connected to the tenth pad 862.

According to an embodiment, the first coil and the second NFC antenna 612 (e.g., the second coil) of the second flexible circuit board 830 may be connected in series to each other by the one end of the first coil being connected to the ninth pad 861, and the other end of the first coil being connected to the tenth pad 862.

According to an embodiment, the one end of the first coil may be connected to the first output terminal Tx1 of the NFC communication module 230 through the ninth pad 861, the seventh wire L7 of the wire connection member 840, the first pad 851 of the main printed circuit board 810, and the first wire L1 of the main printed circuit board 810. According to an embodiment, the other end of the first coil may be connected to the second output terminal Tx2 of the NFC communication module 230 through the tenth pad 862, the eighth wire L8 of the wire connection member 840, the second pad 852 of the main printed circuit board 810, the fifth wire L5 of the main printed circuit board 810, the sixth pad 872 of the main printed circuit board 810, the second NFC antenna 612 (e.g., the second coil) of the second flexible circuit board 830, the fifth pad 871 of the second flexible circuit board 830, and the second wire L2 of the main printed circuit board 810.

Referring to FIG. 9, the first MST antenna 711 may include the third coil having a loop shape. According to an embodiment, the third coil may be connected to the third socket member 860 of the first flexible circuit board 820 fastened to the wire connection member 840. According to an embodiment, one end of the third coil may be connected to the eleventh pad 863, and the other end of the third coil may be connected to the twelfth pad 864.

According to an embodiment, the third coil and the second MST antenna 712 (e.g., the fourth coil) of the second flexible circuit board 830 may be connected in series to each other by the one end of the third coil being connected to the eleventh pad 863, and the other end of the third coil being connected to the twelfth pad 864. According to an embodiment, the one end of the third coil may be connected to the first output terminal Tx1 of the MST communication module 210 through the eleventh pad 863, the ninth wire L9 of the wire connection member 840, the third pad 853 of the main printed circuit board 810, and the third wire L3 of the main printed circuit board 810. According to an embodiment, the other end of the third coil may be connected to the second output terminal Tx2 of the MST communication module 210 through the twelfth pad 864, the tenth wire L10 of the wire connection member 840, the fourth pad 854 of the main printed circuit board 810, the sixth wire L6 of the main printed circuit board 810, the eighth pad 874 of the main printed circuit board 810, the second MST antenna 712 (e.g., the second coil) of the second flexible circuit board 830, the seventh pad 873 of the second flexible circuit board 830, and the fourth wire L4 of the main printed circuit board 810.

The third wire L3 and the fourth wire L4 of the main printed circuit board 810 may be connected to a matching device (not illustrated) for MST communication. For example, the matching device for MST communication may be included in the MST communication module 210.

According to an embodiment, the wireless charging antenna 297-5 of the first flexible circuit board 820 may include a fifth coil having a loop shape. Although not illustrated, the fifth coil may be connected to the wireless charging module 250 included in the main printed circuit board 810 through a path similar to those of the first coil and the third coil. For example, the fifth coil may be connected to the wireless charging module 250 through the wire connection member 840. According to an embodiment, the wireless charging antenna 297-5 may be used as an MST antenna for MST communication as well as being used for wireless charging. According to an embodiment, the electronic device 300 may further include a switch (not illustrated) electrically connecting the wireless charging antenna 297-5 to the first MST antenna 711 and the second MST antenna 712.

According to an embodiment, the second flexible circuit board 830 may include the second antenna member 392 (e.g., the second antenna member 392 in FIG. 5). According to an embodiment, the second antenna member 392 may include the second NFC antenna 612 as illustrated in FIG. 8. According to an embodiment, the second antenna member 392 may further include the second MST antenna 712 as illustrated in FIG. 9.

According to an embodiment, the second flexible circuit board 830 may further include a heat dissipation member (not illustrated) (e.g., a graphite sheet) for preventing/reducing thermal diffusion or a second shielding member 831 (e.g., a shielding sheet) for preventing/reducing damage to a different component due to a strong induced electromagnetic field, and a protection film (not illustrated) for preventing/reducing damage. The second shielding member 831 may include one second shielding sheet or two stacked second shielding sheets. For example, the second shielding member 831 may use one ferrite film or one or two nano crystal films and thus may have a thickness reduced compared to the first shielding member 821.

According to an embodiment, the second NFC antenna 612 and the second MST antenna 712 may be disposed on different layers. According to an embodiment, the second NFC antenna 612 may be disposed on a single layer, and the second MST antenna 712 may be disposed on a single layer. According to an embodiment, the second NFC antenna 612 may be disposed on a single layer, but only at least a part thereof may be disposed on a double layer in order to prevent and/or reduce overlapping between coils. According to an embodiment, the second MST antenna 712 may disposed on a single layer, but only at least a part thereof may be disposed on a double layer in order to prevent and/or reduce overlapping between coils.

According to an embodiment, the thickness of the second shielding member 831 of the second flexible circuit board 830 may be less than that of the first shielding member 821 of the first flexible circuit board 820. According to various embodiments, the thickness of the second shielding member 831 of the second flexible circuit board 830 may be less than that of the first shielding member 821 of the first flexible circuit board 820, whereby the electronic device 300 may have a design margin for accommodation of a component in the first space 501.

Referring to FIG. 8, the first NFC antenna 611 may include the first coil having a loop shape. According to an embodiment, the first coil may be connected to the third socket member 860 of the first flexible circuit board 820 fastened to the wire connection member 840. According to an embodiment, one end of the first coil may be connected to the ninth pad 861, and the other end of the first coil may be connected to the tenth pad 862.

Figure 10:
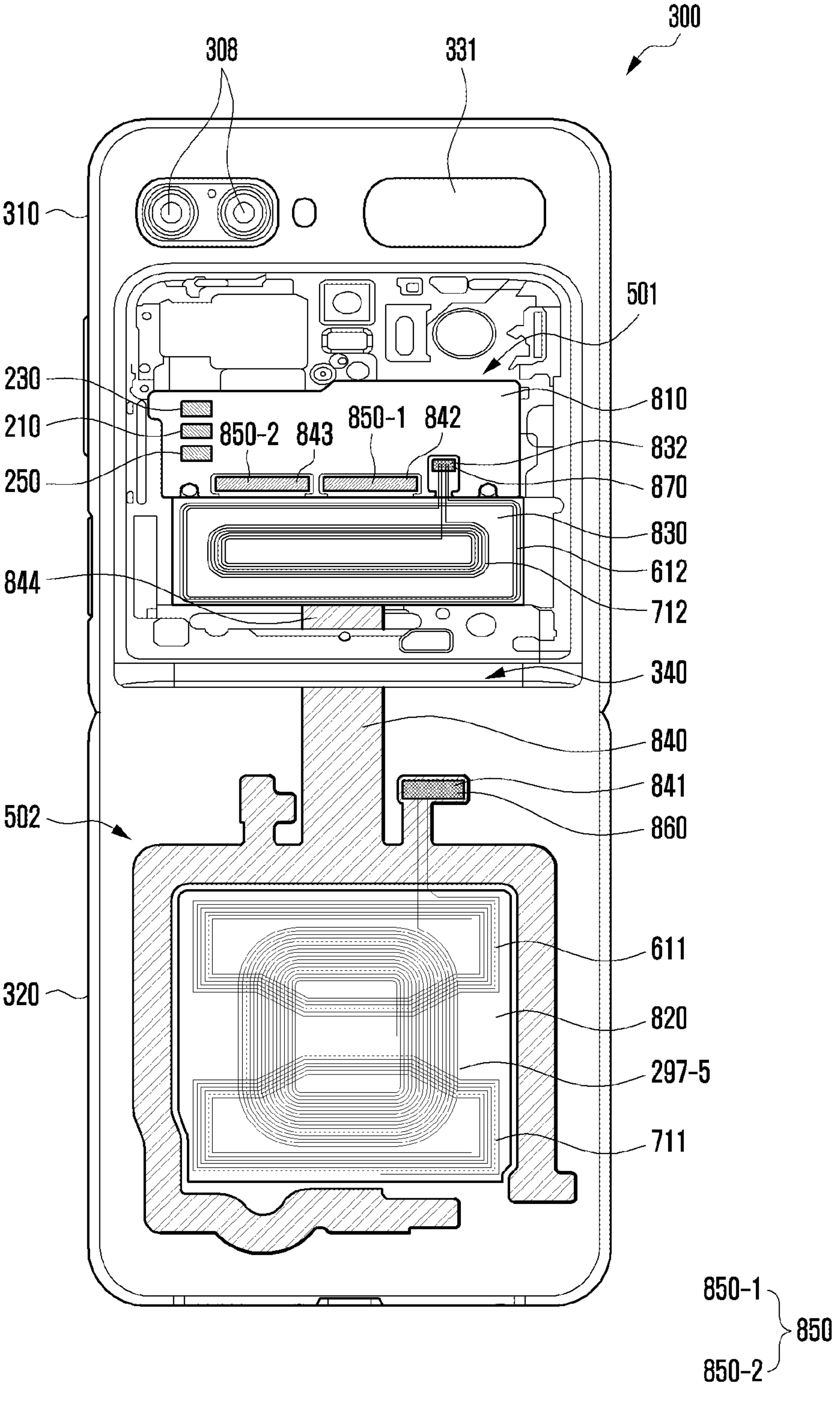
FIG. 10 is a diagram illustrating a rear surface in an unfolded state of an electronic device according to various embodiments.

FIG. 10 is a diagram illustrating a rear surface in an unfolded state of the electronic device 300 (e.g., the electronic device 300 in FIG. 3) according to various embodiments. For example, FIG. 10 may be a layout diagram shown in a state where the first rear cover (e.g., the first rear cover 314 in FIG. 3C) and the second rear cover (e.g., the second rear cover 324 in FIG. 3C) of the electronic device 300 are detached.

The electronic device 300 illustrated in FIG. 10 may include an embodiment identical or at least partially similar to the electronic device 300 illustrated in FIG. 8 and FIG. 9. Hereinafter, for convenience of explanation, elements overlapping with FIG. 8 and FIG. 9 may not be repeated or may be briefly described.

Referring to FIG. 10, in the electronic device 300 according to an embodiment, the first flexible circuit board 820 may be positioned in the second space 502 that is the inside of the second housing 320.

According to an embodiment, the first flexible circuit board 820 may include the first shielding member 821 and the first antenna member 391. For example, the first shielding member 821 and the first antenna member 391 may be arranged on different layers.

According to an embodiment, the first antenna member 391 may include the first NFC antenna 611, the first MST antenna 711, and the wireless charging antenna 297-5. According to an embodiment, the first NFC antenna 611 may overlap with at least a part of the wireless charging antenna 297-5. According to an embodiment, the first MST antenna 711 may overlap with at least a part of the wireless charging antenna 297-5. According to an embodiment, the first NFC antenna 611 and the first MST antenna 711 may not overlap with each other.

According to an embodiment, the first antenna member 391 is connected to the third socket member 860 of the first flexible circuit board 820, thereby being electrically connected to the wire connection member 840.

According to an embodiment, in the electronic device 300, the main printed circuit board 810 and the second flexible circuit board 830 may be positioned in the first space 501 that is the inside of the first housing 310.

According to an embodiment, the main printed circuit board 810 may include communication modules such as the NFC communication module 230, the MST communication module 210, and the wireless charging module 250. According to an embodiment, the communication modules (e.g., the NFC communication module 230, the MST communication module 210, and the wireless charging module 250) may be connected to at least one first socket member 850 and at least one second socket member 870 through wires arranged on the main printed circuit board 810. According to an embodiment, the first socket member 850 (e.g., including 850-1 and 850-2) may be defined as a component fastened to the first connectors 842 and 843 of the wire connection member 840. According to an embodiment, the second socket member 870 may include a component fastened to the third connector 832 of the second flexible circuit board 830.

According to an embodiment, the wire connection member 840 may include the first connectors 842 and 843 and the second connector 841. According to an embodiment, the first connectors 842 and 843 may be positioned in the second space 502 and may be fastened to the third socket member 860 of the second flexible circuit board 830. According to an embodiment, the second connector 841 may be positioned in the first space 501, and may be fastened to the first socket 850 of the main printed circuit board 810. According to an embodiment, the wire connection member 840 may include a connection part 844 crossing over the hinge module 340, thereby extending from inside the first housing 310 to inside the second housing 320.

According to an embodiment, there may be one or multiple first connectors 842 and 843. According to the illustrated example, the main printed circuit board 810 may include multiple first sockets 850 (e.g., 850-1 and 850-2), and the wire connection member 840 may include multiple connectors fastened to the multiple first sockets 850, respectively.

According to an embodiment, the second flexible circuit board 830 may include the second shielding member 831 and the second antenna member 392. For example, the second shielding member 831 and the second antenna member 392 may be arranged on different layers.

According to an embodiment, the second antenna member 392 may include the second NFC antenna 612 and the second MST antenna 712. According to an embodiment, the second NFC antenna 612 may be disposed to surround the periphery of the second MST antenna 712.

According to an embodiment, the thickness of the first shielding member 821 may be greater than that of the second shielding member 831. According to an embodiment, the first shielding member 821 may include three or more stacked first shielding sheets (not illustrated), and the second shielding member 831 may include one second shielding sheet (not illustrated) or two stacked second shielding sheets (not illustrated).

According to an embodiment, the area of the first shielding member 821 may be greater than that of the second shielding member 831.

According to an embodiment, the area of the first NFC antenna 611 (e.g., the first coil) may be greater than that of the second NFC antenna 612 (e.g., the second coil).

According to an embodiment, the area of the first MST antenna 711 (e.g., the third coil) may be greater than that of the fourth MST antenna (e.g., the fourth coil).

According to an embodiment, the first NFC antenna 611 (e.g., the first coil) may be an NFC main antenna resonating in a 13.56 MHz band, and the second NFC antenna 612 (e.g., the second coil) may be an NFC sub antenna resonating in a 12 MHz band. For example, the second NFC antenna 612 may be a radiator for performing NFC communication according to a card emulation mode refer, for example, to an NFC standard of ISO 18092.

According to an embodiment, the first NFC antenna 611 may include a multi-layer coil disposed on a multi-layer, and the second NFC antenna 612 may include a single layer coil disposed on a single layer.

Figure 11A:
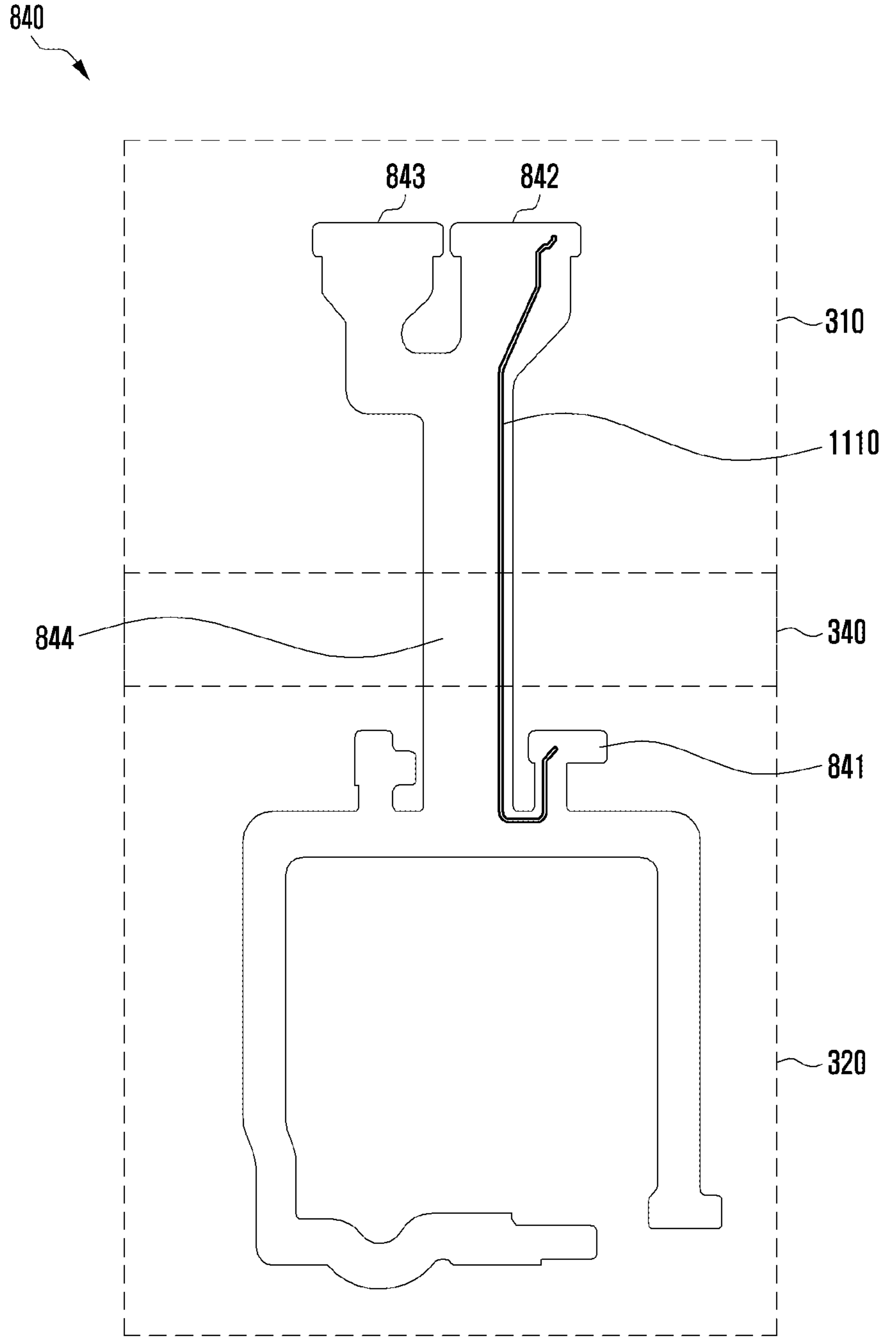
FIG. 11A is a diagram illustrating an example of a wire connection member according to various embodiments.
Figure 11B:
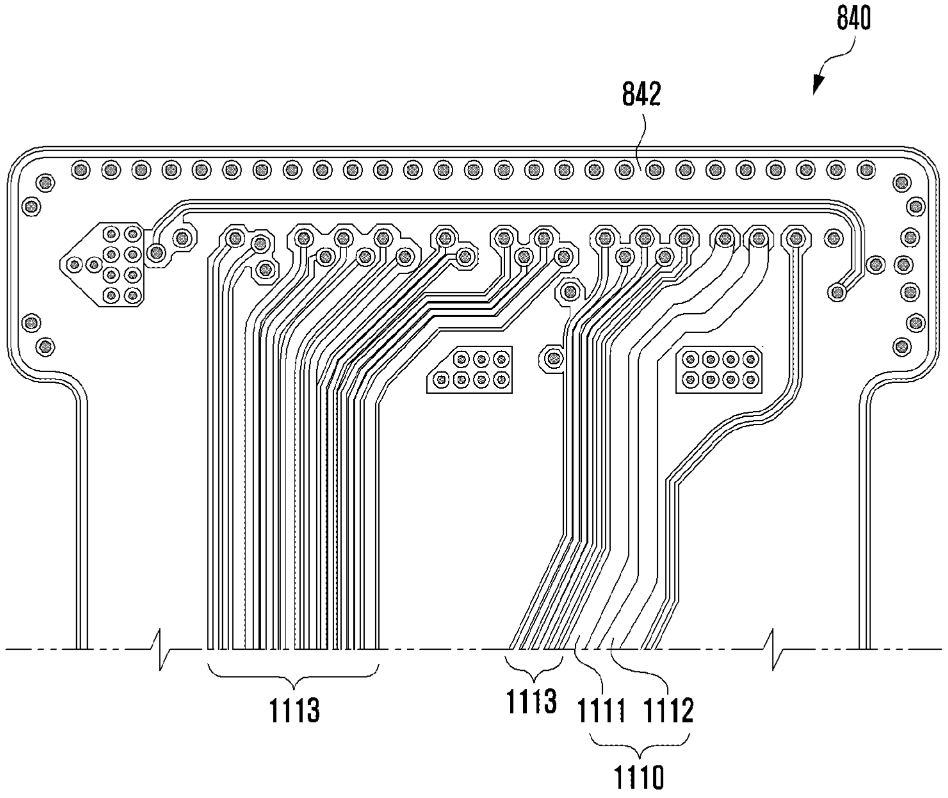
FIG. 11B is a diagram illustrating multiple wires of a wire connection member according to various embodiments.

FIG. 11A is a diagram illustrating an example of the wire connection member 840 according to various embodiments. FIG. 11B is a diagram illustrating multiple wires of the wire connection member 840 according to various embodiments. For example, FIG. 11B may be a layout diagram obtained by enlarging an area in which the first connectors 842 and 843 illustrated in FIG. 11A are positioned.

The wire connection member 840 illustrated in FIG. 11A and FIG. 11B may include an embodiment identical or at least partially similar to the wire connection member 840 illustrated in FIG. 8 to FIG. 10. Hereinafter, for convenience of explanation, a description overlapping with FIG. 8 to FIG. 10 may not be repeated or may be briefly described.

Referring to FIG. 11A and FIG. 11B, in the wire connection member 840 according to an embodiment, the first connectors 842 and 843 are positioned in the first housing 310, and the second connector 841 may be positioned in the second housing 320.

According to an embodiment, the wire connection member 840 may include the connection part 844 crossing over the hinge module 340, thereby extending from inside the first housing 310 to inside the second housing 320.

According to an embodiment, the wire connection member 840 may include at least one NFC wire 1111 (e.g., the seventh wire L7 and the eighth wire L8 in FIG. 8) transmitting an NFC signal related to NFC communication.

According to an embodiment, the wire connection member 840 may include at least one MST wire 1112 (e.g., the ninth wire L9 and the tenth wire L10 in FIG. 9) transmitting an MST signal related to MST communication.

According to an embodiment, the wire connection member 840 may include multiple wires, and wires 1110 related to short-range wireless communication, such as the at least one NFC wire 1111 transmitting an NFC signal and the at least one MST wire 1112 transmitting an MST signal, may be arranged as outermost wires. For example, the wire connection member 840 may include multiple wires 1110 and 1113, and the at least one NFC wire 1111 transmitting an NFC signal and the at least one MST wire 1112 transmitting an MST signal may be arranged as outermost wires among the multiple wires 1110 and 1113. According to an embodiment, in the wire connection member 840, the NFC wires 1111 and/or the MST wires 1112 are arranged as the outermost wires, whereby signal interference with the dummy wires 1113 transmitting a high-frequency signal, a power signal, a control signal, and/or a data signal may be reduced. The dummy wires mentioned in this disclosure do not indicate wires not used, and may refer, for example, to wires not related to various embodiments of the disclosure. For example, dummy wires may be referred to, for example, using a term such as a power wire or a control signal wire.

Figure 12A:
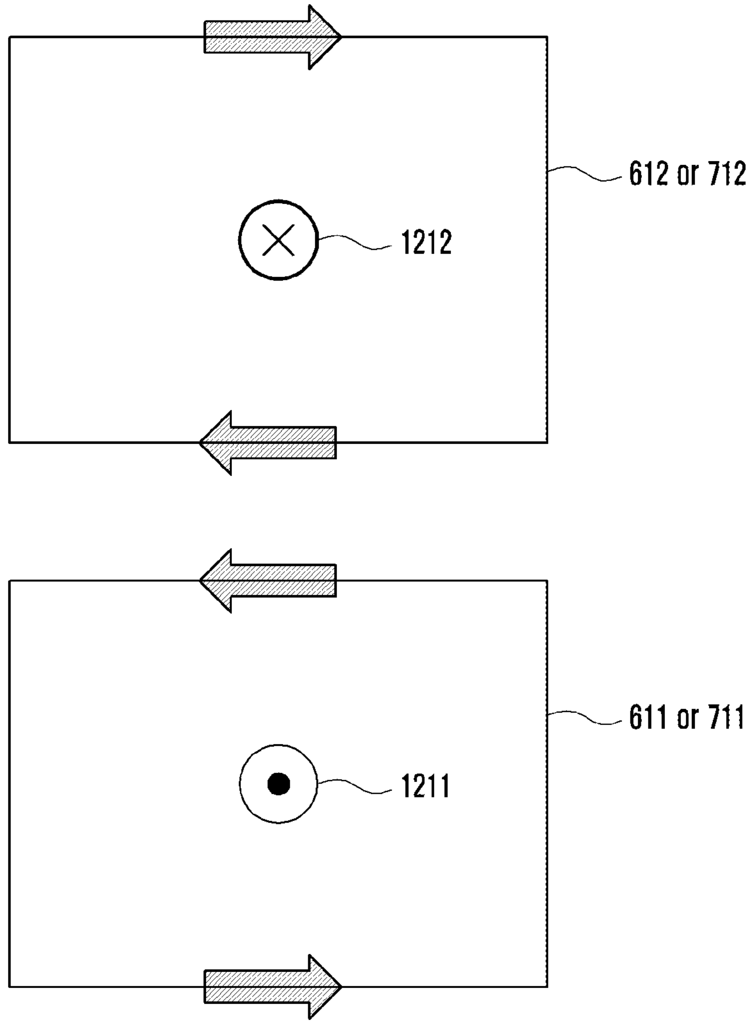
FIG. 12A is a diagram illustrating an example of a magnetic field generated by an NFC antenna or an MST antenna according to various embodiments.
Figure 12B:
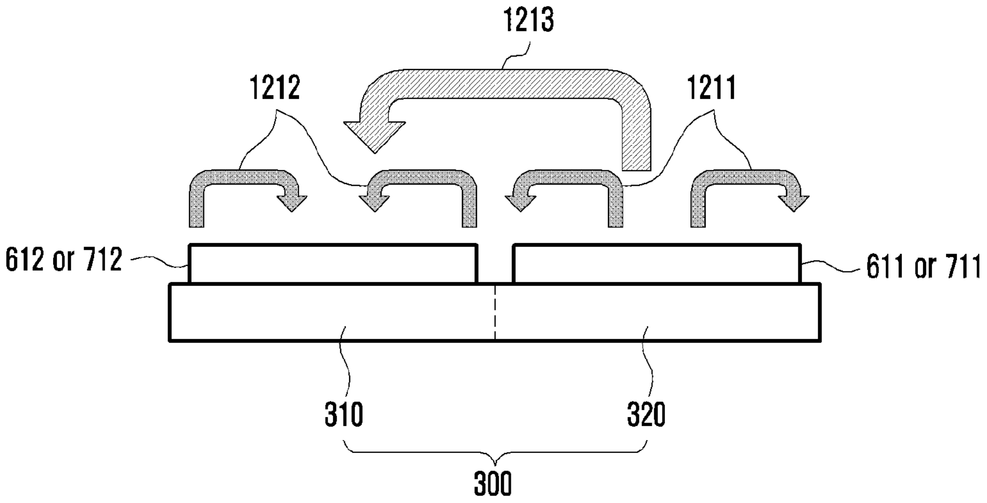
FIG. 12B is a diagram illustrating an example of a magnetic field generated by an NFC antenna or an MST antenna when an electronic device is in an unfolded state according to various embodiments.
Figure 12C:
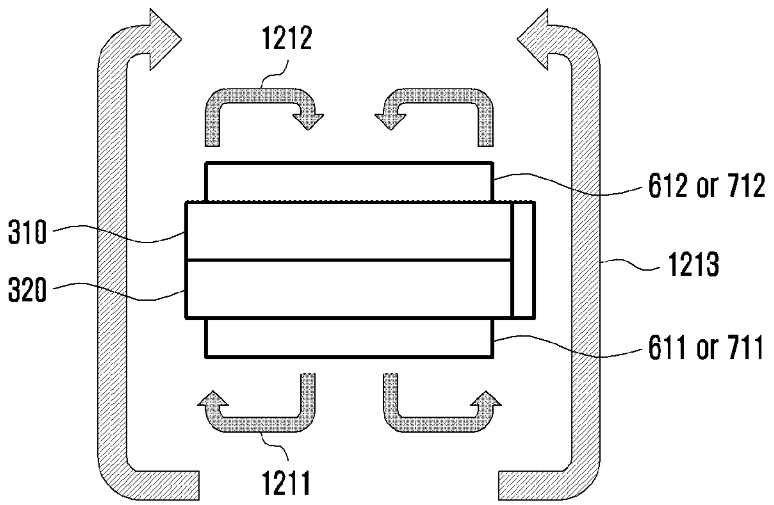
FIG. 12C is a diagram illustrating an example of a magnetic field generated by an NFC antenna or an MST antenna when an electronic device is in a folded state according to various embodiments.

FIG. 12A is a diagram illustrating an example of a magnetic field generated by an NFC antenna or an MST antenna according to various embodiments. FIG. 12B is a diagram illustrating an example of a magnetic field generated by an NFC antenna or an MST antenna when an electronic device is in an unfolded state according to various embodiments. FIG. 12C is a diagram illustrating an example of a magnetic field generated by an NFC antenna or an MST antenna when an electronic device is in a folded state according to various embodiments.

Referring to FIG. 12A, FIG. 12B and FIG. 12C, the electronic device 300 according to an embodiment may have an extended NFC operation range by respective NFC antennas (e.g., the NFC antenna 297-3 in FIG. 2) arranged in the first housing 310 and the second housing 320.

According to an embodiment, the direction of current flowing through the first NFC antenna 611 may be different from the direction of current flowing through the second NFC antenna 612. According to an illustrated example, the first NFC antenna 611 may operate to allow current to flow in a counterclockwise direction, and accordingly, a first magnetic field 1211 may be generated around the first NFC antenna 611 in a direction (e.g., the second direction of the electronic device 300) substantially going out of the first NFC antenna 611. According to an illustrated example, the second NFC antenna 611 may operate to allow current to flow in a clockwise direction, and accordingly, a second magnetic field 1212 may be generated around the second NFC antenna 612 in a first direction (e.g., the first direction of the electronic device 300) substantially entering into the second NFC antenna 612.

Figure 16:
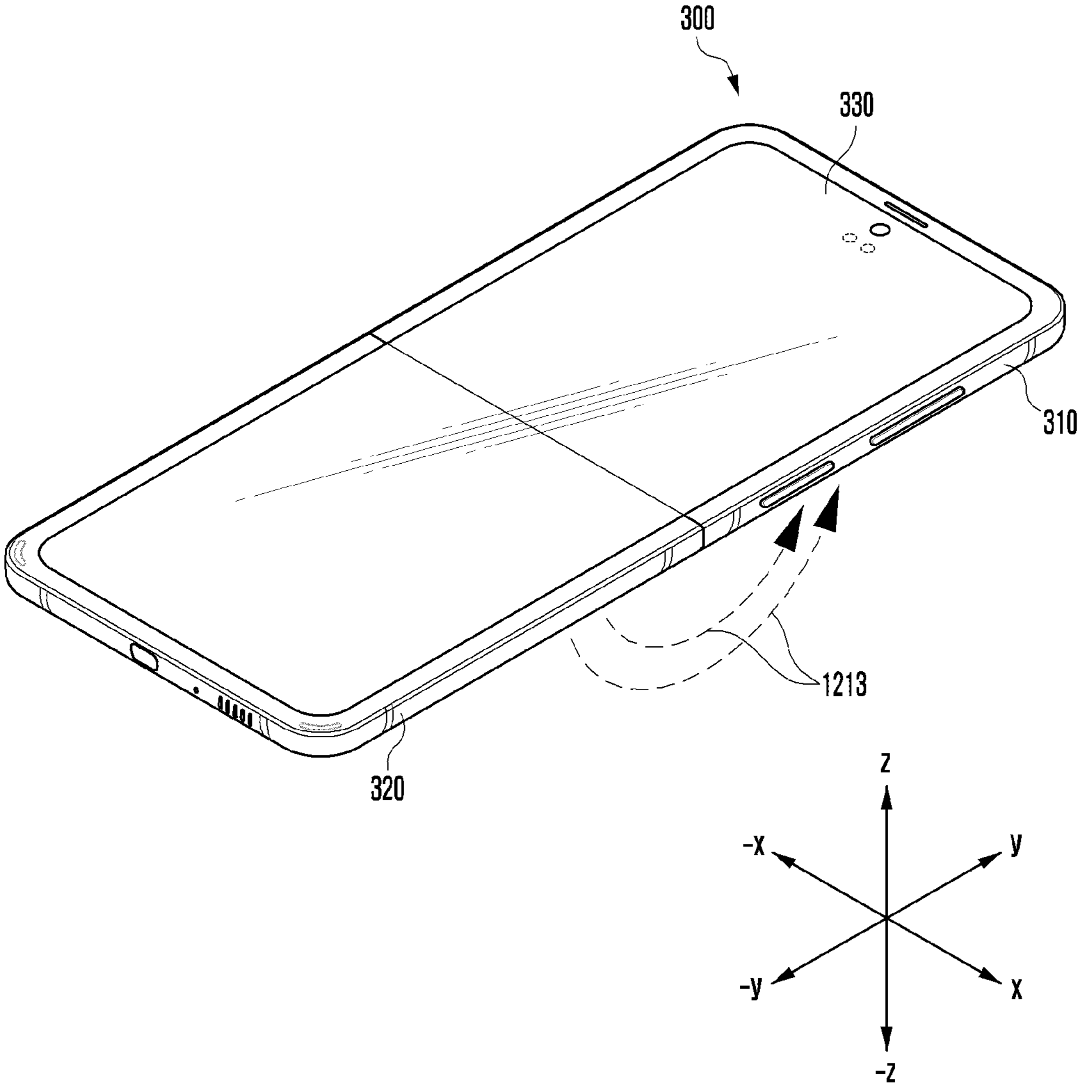
FIG. 16 is a diagram illustrating an example of a magnetic field generated by an NFC antenna or an MST antenna when an electronic device is in an unfolded state according to various embodiments.

Referring to FIG. 12B, when the foldable housing 310 and 320 is in an unfolded state, a part 1213 of the first magnetic fields 1211 generated by the first NFC antenna 611 may be generated to be oriented toward the second NFC antenna 612. According to an embodiment, the part 1213 of the first magnetic fields 1211 is oriented toward the second NFC antenna 612, whereby an operation range of the NFC antenna 297-3 may be extended. For example, as illustrated in FIG. 16, when the foldable housing 310 and 320 is in an unfolded state, the part 1213 of the first magnetic fields 1211 generated by the first NFC antenna 611 is generated to be oriented toward the second NFC antenna 612, whereby the NFC antenna 297-3 may operate normally substantially in most of the areas of the first housing 310 and the second housing 320.

Figure 14:
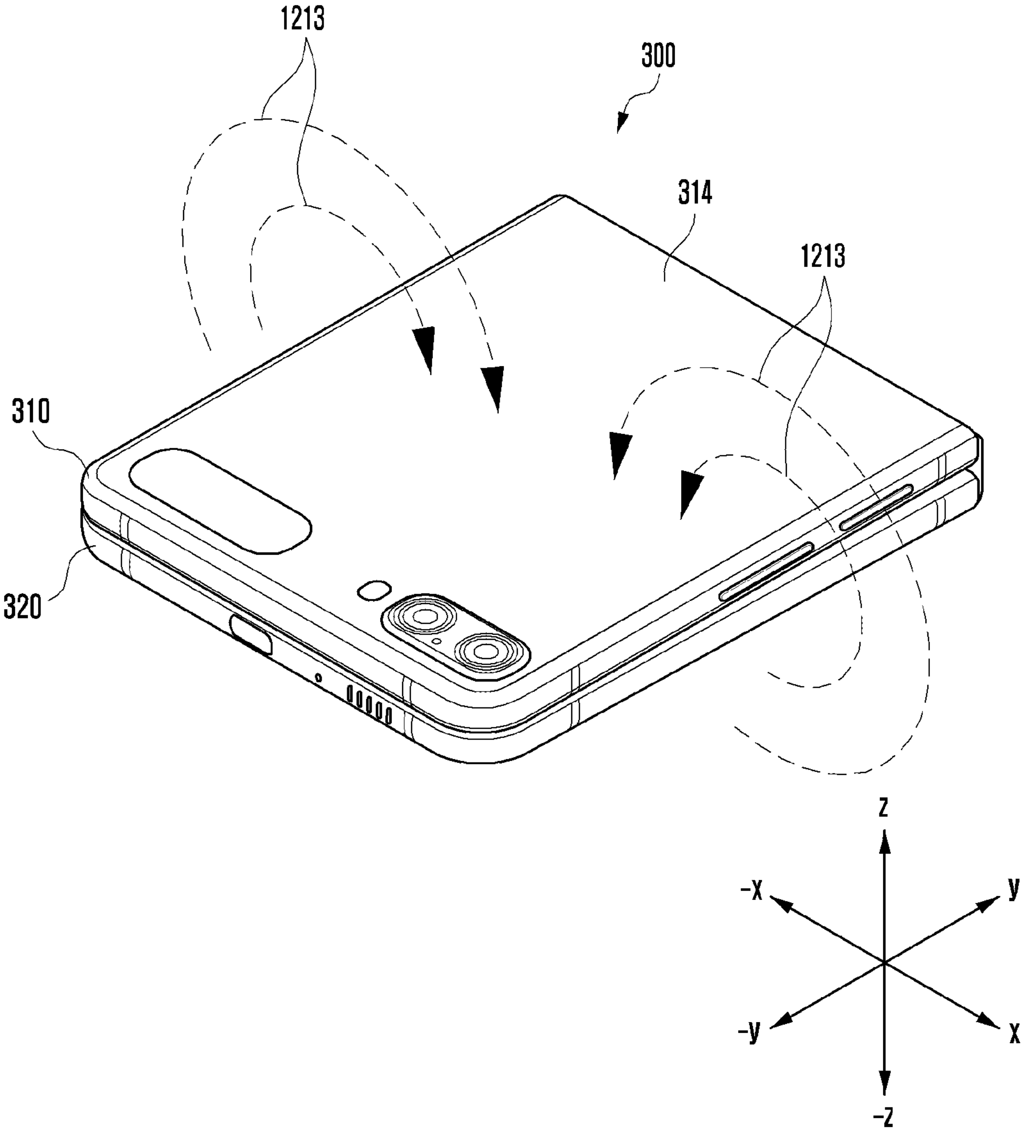
FIG. 14 is a diagram illustrating an example of a magnetic field generated by an NFC antenna or an MST antenna when an electronic device is in a folded state according to various embodiments.
Figure 15:
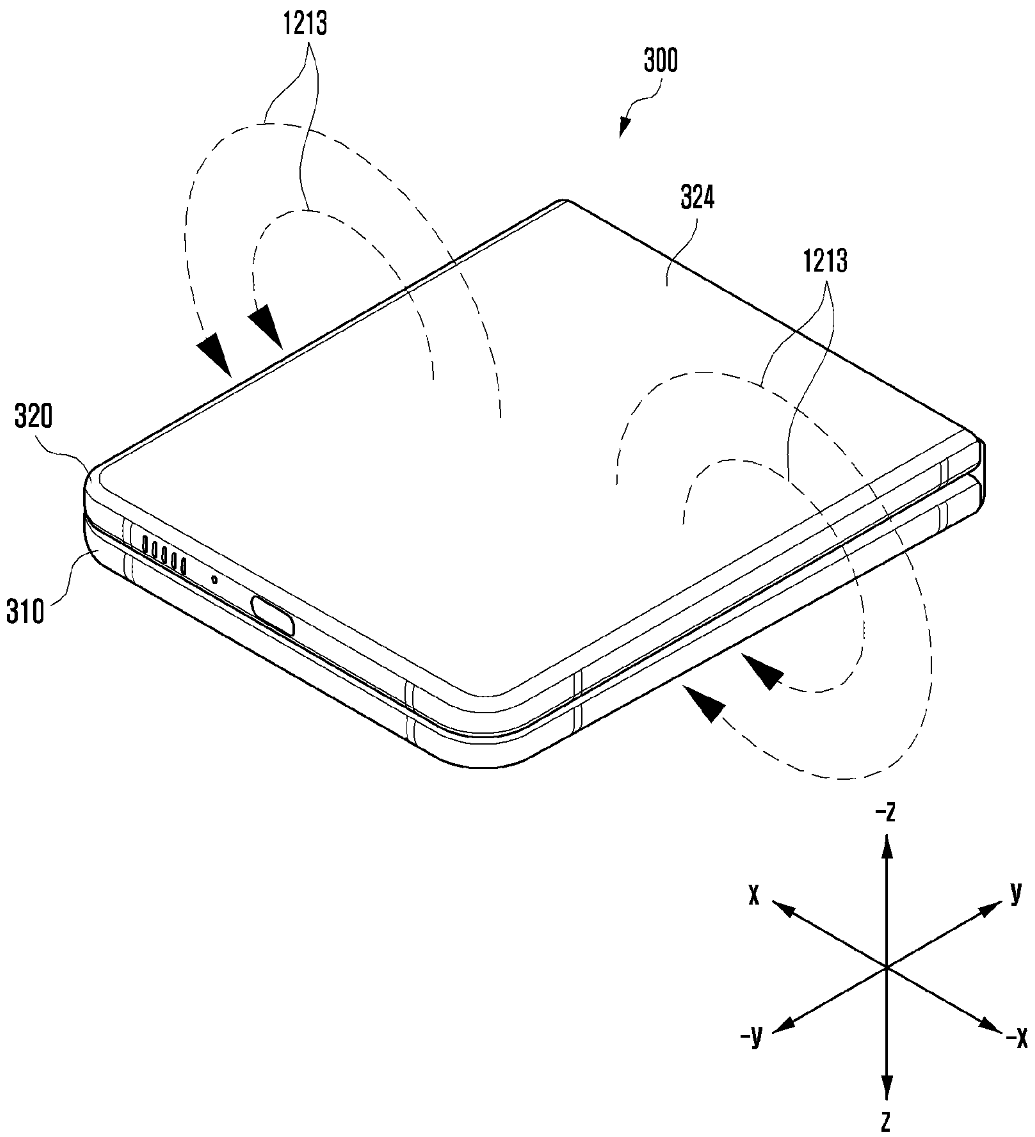
FIG. 15 is a diagram illustrating an example of a magnetic field generated by an NFC antenna or an MST antenna when an electronic device is in a folded state according to various embodiments.

Referring to FIG. 12C, when the foldable housing 310 and 320 is in a folded state, a part 1213 of the first magnetic fields 1211 generated by the first NFC antenna 611 may be generated to be oriented toward the second NFC antenna 612. According to an embodiment, the part 1213 of the first magnetic fields 1211 is oriented toward the second NFC antenna 612, whereby the NFC antenna 297-3 of the electronic device 300 may operate normally regardless of a direction in which the electronic device 300 is placed. For example, as illustrated in FIG. 14, when the foldable housing is in a folded state, in a case where the second housing 320 is placed downwards (e.g., the gravity direction or −z direction) and the first housing 310 is placed upwards (e.g., the direction against the gravity, or z direction), the part 1213 of the first magnetic fields 1211 generated by the first NFC antenna 611 is generated to be oriented toward the second NFC antenna 612, whereby the NFC antenna 297-3 may operate normally. For example, as illustrated in FIG. 15, when the electronic device 300 is in a folded state, in a case where the second housing 320 is placed upwards (e.g., the direction against the gravity or z direction) and the first housing 310 is placed downwards (e.g., the gravity direction or −z direction), the part 1213 of the first magnetic fields 1211 generated by the first NFC antenna 611 is generated to be oriented toward the second NFC antenna 612, whereby the NFC antenna 297-3 may operate normally According to an embodiment, a magnetic field generated by the first NFC antenna 611 may be similar to a magnetic field generated by the first MST antenna 711, and a magnetic field generated by the second NFC antenna 612 may be similar to a magnetic field generated by the second MST antenna 712. Therefore, a description for an operation of the MST antenna 297-1 and a magnetic field generated by the MST antenna 297-1 will be substantially similar to the above description for the NFC antenna 297-3, and thus a repeated description will not be provided.

Figure 13A:
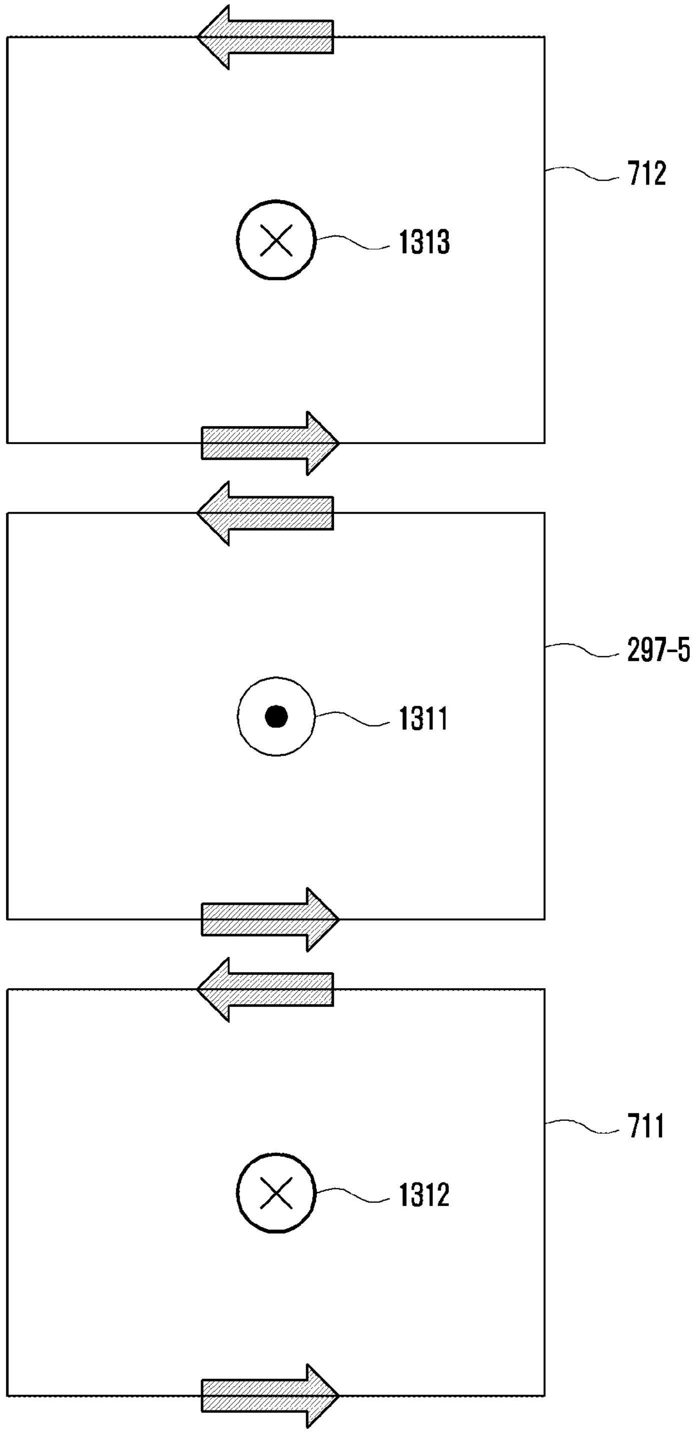
FIG. 13A is a diagram illustrating an example of a magnetic field generated when a wireless charging antenna is used as an MST antenna according to various embodiments.
Figure 13B:
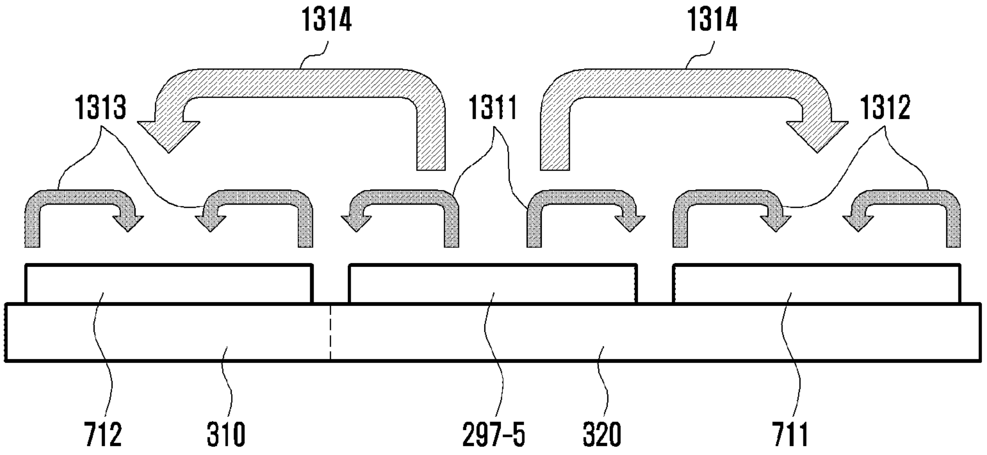
FIG. 13B is a diagram illustrating an example of a magnetic field generated when a wireless charging antenna is used as an MST antenna in a case when a foldable housing is in an unfolded state according to various embodiments.

FIG. 13A is a diagram illustrating an example of a magnetic field generated when the wireless charging antenna 297-5 is used as an MST antenna according to various embodiments. FIG. 13B is a diagram illustrating an example of a magnetic field generated when the wireless charging antenna 297-5 is used as an MST antenna in a case when a foldable housing is in an unfolded state according to various embodiments.

Referring to FIG. 13A and FIG. 13B, in the electronic device 300 according to an embodiment, the wireless charging antenna 297-5 may be used as an MST antenna.

According to an embodiment, when the wireless charging antenna 297-5 is used as an MST antenna, the direction of current flowing through the first MST antenna 711 may be the same as the direction of current flowing through the second MST antenna 712. According to an embodiment, when the wireless charging antenna 297-5 is used as an MST antenna, the direction of current flowing through the first MST antenna 711 may be different from the direction of current flowing through the wireless charging antenna 297-5.

According to an illustrated example, the first MST antenna 711 and the second MST antenna 712 may operate to allow current to flow in a counterclockwise direction, and accordingly, third magnetic fields 1312 and 1313 may be generated around the first MST antenna 711 and the second MST antenna 712 in a first direction (e.g., the first direction of the electronic device 300) substantially entering into the first MST antenna 711 or the second MST antenna 712.

According to an illustrated example, the wireless charging antenna 297-5 may operate to allow current to flow in a clockwise direction, and accordingly, a fourth magnetic field 1311 may be generated around the wireless charging antenna 297-5 in a direction (e.g., the second direction of the electronic device 300) substantially going out of the wireless charging antenna 297-5.

Referring to FIG. 13B, when the foldable housing is in an unfolded state, a part 1314 of the fourth magnetic fields 1311 generated by the wireless charging antenna 297-5 may be generated to be oriented toward the first MST antenna 711 or the second MST antenna 712. According to an embodiment, the part 1314 of the fourth magnetic fields 1311 is oriented toward the first MST antenna 711 or the second MST antenna 712, whereby an operation range of the MST antenna may be extended.

FIG. 14 and FIG. 15 are diagrams illustrating an example magnetic field generated by an NFC antenna or an MST antenna when an electronic device is in a folded state according to various embodiments. For example, FIG. 14 may illustrate a magnetic field generated by an NFC antenna or an MST antenna in a state where the first rear cover 314 configuring at least a part of the second surface 312 of the electronic device 300 is placed to be oriented upwards. For example, FIG. 15 may illustrate a magnetic field generated by an NFC antenna or an MST antenna in a state where the second rear cover 324 configuring at least a part of the fourth surface 322 of the electronic device 300 is placed to be oriented upwards.

The electronic device 300 illustrated in FIG. 14 and FIG. 15 may include an embodiment at least partially similar or identical to the electronic devices 300 illustrated in FIG. 3A to FIG. 13.

Referring to FIG. 14 and FIG. 15, the electronic device 300 according to an embodiment may have an extended NFC operation range by respective NFC antennas (e.g., the NFC antenna 297-3 in FIG. 2) arranged in the first housing 310 and the second housing 320.

According to an illustrated example, a magnetic field may be generated around the first NFC antenna 611 disposed in the second housing 320 in a direction (e.g., the second direction of the electronic device 300) substantially going out of the first NFC antenna (e.g., the first NFC antenna 611 in FIG. 10). A magnetic field may be generated around the second NFC antenna (e.g., the second NFC antenna 612 in FIG. 10) disposed in the first housing 310 in a first direction (e.g., the first direction of the electronic device 300) substantially entering into the second NFC antenna 612. Accordingly, when the electronic device 300 is in a folded state, the magnetic field 1213 generated by the first NFC antenna 611 and the second NFC antenna 612 may be generated to come out of the second rear cover 324 and enter into the first rear cover 314.

According to an embodiment, a magnetic field generated by the first NFC antenna 611 may be similar to a magnetic field generated by the first MST antenna (e.g., the first MST antenna 711 in FIG. 10), and a magnetic field generated by the second NFC antenna 612 may be similar to a magnetic field generated by the second MST antenna (e.g., the second MST antenna 712 in FIG. 10). Therefore, a description for an operation of the MST antenna (e.g., the MST antenna 297-1 in FIG. 2) and a magnetic field generated by the MST antenna 297-1 will be replaced with the above description for the NFC antenna 297-3.

FIG. 16 is a diagram illustrating an example magnetic field generated by an NFC antenna or an MST antenna when an electronic device is in an unfolded state according to various embodiments.

The electronic device 300 illustrated in FIG. 16 may include an embodiment at least partially similar or identical to the electronic devices 300 illustrated in FIG. 3A to FIG. 13.

Referring to FIG. 16, the electronic device 300 according to an embodiment may have an extended NFC operation range by respective NFC antennas (e.g., the NFC antenna 297-3 in FIG. 2) arranged in the first housing 310 and the second housing 320.

According to an illustrated example, a magnetic field may be generated around the first NFC antenna 611 disposed in the second housing 320 in a direction (e.g., the second direction of the electronic device 300) substantially going out of the first NFC antenna (e.g., the first NFC antenna 611 in FIG. 10). A magnetic field may be generated around the second NFC antenna (e.g., the second NFC antenna 612 in FIG. 10) disposed in the first housing 310 in a first direction (e.g., the first direction of the electronic device 300) substantially entering into the second NFC antenna 612. Accordingly, when the electronic device 300 is in an unfolded state, the magnetic field 1213 generated by the first NFC antenna 611 and the second NFC antenna 612 may be generated to come out of the second rear cover 324 and enter into the first rear cover 314.

According to an embodiment, a magnetic field generated by the first NFC antenna 611 may be similar to a magnetic field generated by the first MST antenna (e.g., the first MST antenna 711 in FIG. 10), and a magnetic field generated by the second NFC antenna 612 may be substantially similar to a magnetic field generated by the second MST antenna (e.g., the second MST antenna 712 in FIG. 10). Therefore, a description for an operation of the MST antenna (e.g., the MST antenna 297-1 in FIG. 2) and a magnetic field generated by the MST antenna 297-1 may be replaced with the above description for the NFC antenna 297-3.

Figure 17:
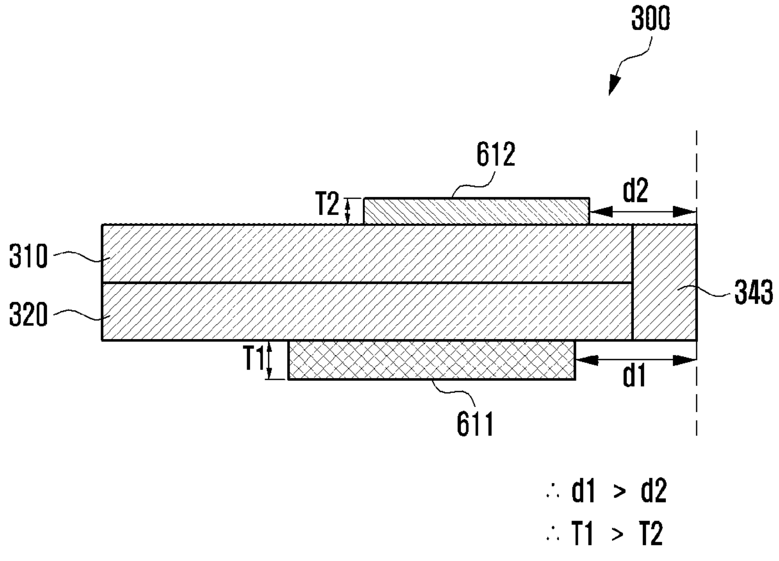
FIG. 17 is a sectional view illustrating an arrangement of an NFC antenna when an electronic device is in a folded state according to various embodiments.

FIG. 17 is a sectional view illustrating an example arrangement of an NFC antenna when an electronic device is in a folded state according to various embodiments.

The electronic device 300 illustrated in FIG. 17 may include an embodiment at least partially similar or identical to the electronic devices 300 illustrated in FIG. 3A to FIG. 13. Hereinafter, various features of the electronic device 300 will be described with reference to FIG. 17.

According to an illustrated example, the second housing 320 may include the first NFC antenna 611, and the first housing may include the second NFC antenna 612.

The first NFC antenna 611 may be disposed to be spaced a designated first distance d1 apart from one end of the hinge housing (e.g., the hinge cover or the hinge housing 343 in FIG. 5) when the electronic device 300 is in a folded state.

The second NFC antenna 612 may be disposed to be spaced a designated second distance d2 apart from one end of the hinge housing 343 when the electronic device 300 is in a folded state.

According to an embodiment, the first distance d1 may be greater than the second distance d2. According to an embodiment, the first distance d1 may be the same as the second distance d2.

According to an embodiment, the first NFC antenna 611 may be configured to have a first thickness T1, the second NFC antenna 612 may be configured to have a second thickness T2, and the first thickness T1 may be greater than the second thickness T2.

According to various embodiments, a stacked structure of the first flexible circuit board 820 including the first NFC antenna 611 may be the same as Table 1.

TABLE 1

| | |
|---|---|
| Graphite | Cover film |
| | Graphite |
| | Adhesive |
| First shielding member layer (nano layer) | Cover film |
| | Nano ribbon |
| | Adhesive |
| | Nano ribbon |
| | Adhesive |
| | Cover film |
| | Nano ribbon |
| | Adhesive |
| | Nano ribbon |
| | Adhesive |
| | Nano ribbon |
| | Adhesive |
| First coil layer | Cover layer |
| | Cu plating |
| | Cu layer |
| | Base film |
| | Cu layer |
| | Cu plating |
| | Cover layer |
| Cushion layer (cushion) | Cushion |

Referring to Table 1, the first NFC antenna 611 according to various embodiments may include a cushion layer including a cushioning member (e.g., cushion), a first coil layer, a first shielding member layer, and a heat dissipation layer. The first coil layer may include a base layer (base film), and at least one copper layer (Cu layer), at least one plating layer (Cu plating), and at least one cover layer arranged on each of an upper layer and a lower layer of the base layer with respect to the base layer.

The first shielding member layer (e.g., nano layer or the first shielding member 821 in FIG. 8) may include multiple shielding layers (nano ribbon) including a shielding material, multiple adhesive layers (or adhesive), and a cover layer (cover film).

The heat dissipation layer may include, for example, graphite. For example, the heat dissipation layer may include at least one graphite layer, at least one adhesive layer, and a cover layer (cover film).

According to various embodiments, a stacked structure of the second flexible circuit board 830 including the second NFC antenna 612 may be the same as Table 2.

TABLE 2

| | |
|---|---|
| Second shielding member layer (nano layer) | Cover film |
| | Nano ribbon |
| | Adhesive |
| Second coil layer | Cover layer |
| | Cu plating |
| | Cu layer |
| | Base film |
| | Cu layer |
| | Cu plating |
| | Cover layer |

Referring to Table 2, the second NFC antenna 612 according to various embodiments may include a second coil layer and a second shielding member layer. The second coil layer may include a base layer (base film), and a copper layer (Cu layer), a plating layer (Cu plating), and a cover layer arranged on each of an upper layer and a lower layer of the base layer with respect to the base layer.

The second shielding member layer (e.g., nano layer or the second shielding member 831 in FIG. 8) may include one shielding layer (nano ribbon) including a shielding material, one adhesive layer (or adhesive), and a cover layer (cover film).

In comparison between Table 1 and Table 2, the second NFC antenna 612 does not include a cushion layer and includes a single shielding layer, thereby having a small thickness than the first NFC antenna 611.

Figure 18:
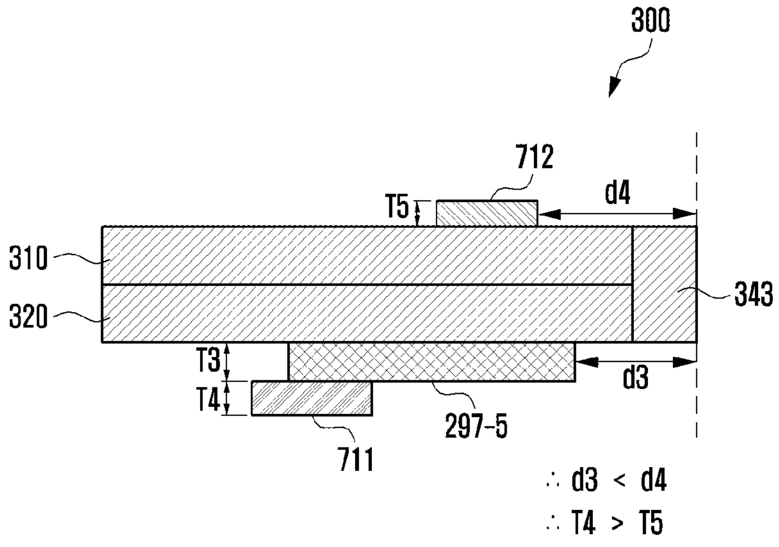
FIG. 18 is a sectional view illustrating an arrangement of an MST antenna when an electronic device is in a folded state according to various embodiments.

FIG. 18 is a sectional view illustrating an example arrangement of an MST antenna when an electronic device is in a folded state according to various embodiments.

The electronic device 300 illustrated in FIG. 18 may include an embodiment at least partially similar or identical to the electronic devices 300 illustrated in FIG. 3*a* to FIG. 13. Hereinafter, various features of the electronic device 300 will be described with reference to FIG. 18.

According to an illustrated example, the second housing 320 may include the first MST antenna (e.g., the first MST antenna 711 in FIG. 8) and the wireless charging antenna (e.g., the wireless charging antenna 297-5 in FIG. 8) as a radiation part for MST communication, and the first housing 310 may include the second MST antenna 712. For example, in the second housing 320, the wireless charging antenna 297-5 may operate as a radiation part for MST communication while the electronic device 300 performs MST communication.

The wireless charging antenna 297-5 may be disposed to be spaced a designated third distance d3 apart from one end of the hinge housing (e.g., the hinge cover or the hinge housing 343 in FIG. 5) when the electronic device 300 is in a folded state.

The second MST antenna 712 may be disposed to be spaced a designated fourth distance d4 apart from one end of the hinge housing 343 when the electronic device 300 is in a folded state.

According to an embodiment, the fourth distance d4 may be greater than the third distance d3.

According to an embodiment, the wireless charging antenna 297-5 may be configured to have a third thickness T3, the first MST antenna 711 may be configured to have a fourth thickness T4, the second MST antenna 712 may be configured to have a fifth thickness T5, and the fourth thickness T4 may be greater than the fifth thickness T5. For example, while a coil for MST communication in the second MST antenna 712 is disposed on multiple layers, a coil for MST communication in the first MST antenna 711 may be disposed on a single layer.

According to an embodiment, the first MST antenna 711 may include a first part (not illustrated) disposed on the same layer (e.g., the layer represented by the third thickness T3 in FIG. 18) as that of the wireless charging antenna 297-5, and a second part (not illustrated) disposed on a layer (e.g., the layer represented by the fourth thickness T4 in FIG. 18) different from that of the wireless charging antenna 297-5. For example, the first MST antenna 711 may have a thickness corresponding to "T3+T4" illustrated in FIG. 18, and the thickness T3+T4 of the first MST antenna 711 may be greater than the fifth thickness T5 of the second MST antenna 712.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a foldable housing including a first housing, a second housing, and a hinge module, including a hinge, disposed between at least the first housing and the second housing;

a first coil positioned in the second housing and including a designated n number of turns;

a second coil positioned in the first housing, including a designated m number of turns less than the n turns, and connected in series to the first coil by at least a wire connection member including at least one wire disposed to cross over the hinge module to extend from inside the first housing to inside the second housing;

a first flexible circuit board including the first coil and positioned in the second housing;

a second flexible circuit board including the second coil and positioned in the first housing;

a communication module, comprising communication circuitry, electrically connected to the first coil and the second coil; and a processor, comprising processing circuitry, configured to control the communication module, wherein the communication module comprises first and second output terminals, wherein one end of the first coil is electrically connected to the first output terminal, and an opposite end of the first coil is electrically connected to one end of the second coil via the at least one wire, wherein an opposite end of the second coil is electrically connected to the second output terminal, wherein the first flexible circuit board further comprises a first shielding sheet, wherein the second flexible circuit board further comprises a second shielding sheet, and wherein a thickness of the first shielding sheet is greater than a thickness of the second shielding sheet.

2. The electronic device of claim 1, wherein an area of the first coil is greater than an area of the second coil.

3. The electronic device of claim 1, wherein the first coil includes an NFC main antenna configured to resonate in a 13.56 MHz band, and wherein the second coil includes an NFC sub antenna configured to resonate in a 12 MHz band.

4. The electronic device of claim 1, wherein the first coil comprises a multi-layer coil disposed on a multi-layer, and wherein the second coil comprises a single layer coil disposed on a single layer.

5. The electronic device of claim 1, wherein the first coil is configured to generate a magnetic field in a second direction in a folded state of the foldable housing, and wherein the second coil is configured to generate a magnetic field in a first direction opposite to the second direction in the folded state of the foldable housing.

6. The electronic device of claim 1, wherein the first coil is configured to generate a magnetic field in a second direction in an unfolded state of the foldable housing, and wherein the second coil is configured to generate a magnetic field in a first direction opposite to the second direction in the unfolded state of the foldable housing.

7. An electronic device comprising:

a foldable housing including a first housing, a second housing, and a hinge module, including a hinge, disposed between the first housing and the second housing;

a first coil positioned in the second housing and including a designated n number of turns;

a second coil positioned in the first housing, including a designated m number of turns less than the n turns, and connected in series to the first coil;

a communication module, comprising communication circuitry, electrically connected to the first coil and the second coil;

a processor, comprising processing circuitry, configured to control the communication module;

a main printed circuit board including the communication module and positioned in the first housing;

a first flexible circuit board including the first coil and positioned in the second housing;

a second flexible circuit board including the second coil and electrically connected to the main printed circuit board in the first housing; and a wire connection member including at least one wire disposed to cross over the hinge module to extend from inside the first housing to inside the second housing, and electrically connecting the main printed circuit board and the second flexible circuit board to each other, wherein the communication module comprises first and second output terminals, wherein one end of the first coil is electrically connected to the first output terminal, and an opposite end of the first coil is electrically connected to one end of the second coil via the at least one wire, wherein an opposite end of the second coil is electrically connected to the second output terminal, wherein the first flexible circuit board further comprises a first shielding sheet, wherein the second flexible circuit board further comprises a second shielding sheet, and wherein a thickness of the first shielding sheet is greater than a thickness of the second shielding sheet.

8. The electronic device of claim 7, wherein the main printed circuit board comprises:

a first socket fastened to a first connector of the wire connection member;

a second socket fastened to a third connector of the second flexible circuit board; and at least one wire connecting the first socket and the second socket.

9. The electronic device of claim 8, wherein the first coil and the second coil are connected in series to each other through the wire connection member, the first socket, the at least one wire, and the second socket.

10. The electronic device of claim 7, wherein the first shielding sheet comprises three or more stacked first shielding sheets, and wherein the second shielding sheet comprises one second shielding sheet or two stacked second shielding sheets.

11. The electronic device of claim 7, wherein an area of the first shielding sheet is greater than an area of the second shielding sheet.

12. The electronic device of claim 7, wherein the wire connection member comprises a flexible circuit board fastened to the main printed circuit board and the second flexible circuit board in a connector-to-connector scheme.

13. The electronic device of claim 12, wherein the wire connection member comprises multiple wires including an NFC wire including a line configured to transmit an NFC signal related to the first coil and the second coil, and wherein the NFC wire is disposed as an outermost wire among the multiple wires.

14. The electronic device of claim 13, wherein the NFC wire of the wire connection member is disposed on a single layer or a multi-layer.

* * * * *